US012633528B2

(12) United States Patent
Kelly et al.

(10) Patent No.: US 12,633,528 B2
(45) Date of Patent: May 19, 2026

(54) PROTECTED ELECTRODE STRUCTURES FOR SOLID-STATE CELLS

(71) Applicant: Solid Power Operating, Inc., Louisville, CO (US)

(72) Inventors: Brandon Kelly, Longmont, CO (US); A Yang, Erie, CO (US); Edward Burch, Broomfield, CO (US); Uday Kasavajjula, Superior, CO (US)

(73) Assignee: Solid Power Operating, Inc., Louisville, CO (US)

( * ) Notice: Subject to any disclaimer, the term of this patent is extended or adjusted under 35 U.S.C. 154(b) by 789 days.

(21) Appl. No.: 17/977,938

(22) Filed: Oct. 31, 2022

(65) Prior Publication Data

US 2023/0133563 A1 May 4, 2023

Related U.S. Application Data

(60) Provisional application No. 63/263,370, filed on Nov. 1, 2021.

(51) Int. Cl.
H01M 4/40 (2006.01)
H01M 4/04 (2006.01)
(Continued)

(52) U.S. Cl.
CPC ........... H01M 4/405 (2013.01); H01M 4/043 (2013.01); H01M 4/661 (2013.01); *H01M 2004/027* (2013.01); *H01M 2300/0082* (2013.01)

(58) Field of Classification Search
CPC ...... H01M 4/405; H01M 4/043; H01M 4/661; H01M 50/46; H01M 50/461;
(Continued)

(56) References Cited

U.S. PATENT DOCUMENTS

| | | | |
|---|---|---|---|
| 6,025,094 A | 2/2000 | Visco et al. | |
| 6,432,584 B1 | 8/2002 | Visco et al. | |

(Continued)

FOREIGN PATENT DOCUMENTS

| | | | |
|---|---|---|---|
| EP | 2907179 B1 | 12/2017 | |
| JP | 2003282071 A | * 10/2003 | |

(Continued)

OTHER PUBLICATIONS

Kosaka et al., Fuel Battery Cell, Cell Stack, and Fuel Battery, Oct. 2003, See Abstract. (Year: 2003).*

(Continued)

*Primary Examiner* — Tiffany Legette
*Assistant Examiner* — Monique M Wills
(74) *Attorney, Agent, or Firm* — Polsinelli PC; Gregory P. Durbin

(57) ABSTRACT

An encapsulated electrode for an electrochemical cell and a method for producing an encapsulated electrode. The encapsulated electrode structure has a first solid-state electrolyte composite (SSE) that has a top surface, a bottom surface, and a peripheral surface. Another layer of the encapsulated electrode structure is the electrode that has a top surface, a bottom surface, and a peripheral surface. Yet another layer of the encapsulated electrode structure is a second SSE that has a top surface, a bottom surface, and a peripheral surface. The first SSE is arranged so as to be attached to the electrode, wherein the bottom surface of the first SSE is attached to the top surface of the electrode. The bottom surface of the electrode is attached to the top surface of the second SSE. Pressure is applied to this stack so that the SSEs deform and encapsulate the electrode.

25 Claims, 12 Drawing Sheets

(51) Int. Cl.
    *H01M 4/66*        (2006.01)
    *H01M 4/02*        (2006.01)

(58) Field of Classification Search
    CPC ....... H01M 50/466; H01M 2300/0065; H01M
                2300/0068; H01M 2300/0071; H01M
                2300/0074; H01M 2300/0088; H01M
                      2300/0094; H01M 2300/0097
    See application file for complete search history.

(56)                References Cited

U.S. PATENT DOCUMENTS

| | | |
|---|---|---|
| 6,737,197 B2 | 5/2004 | Chu et al. |
| 7,858,223 B2 | 12/2010 | Visco et al. |
| 9,362,538 B2 | 6/2016 | Visco et al. |
| 9,601,779 B2 | 3/2017 | Visco et al. |
| 10,629,950 B2 | 4/2020 | Visco et al. |
| 2006/0078790 A1 | 4/2006 | Nimon et al. |
| 2015/0333376 A1 | 11/2015 | Gaben |
| 2020/0028156 A1 | 1/2020 | Zhang et al. |
| 2021/0126286 A1* | 4/2021 | Rogojina .............. H01M 4/583 |
| 2023/0399239 A1 | 12/2023 | Lim et al. |

FOREIGN PATENT DOCUMENTS

| | | |
|---|---|---|
| WO | WO 2012/077197 A1 | 6/2012 |
| WO | WO 2022/114140 A1 | 6/2022 |

OTHER PUBLICATIONS

International Searching Authority, International Search Report and Written Opinion, issued for International Application No. PCT/US2022/048469, mailed Mar. 7, 2023 (11 pages).

* cited by examiner

200

| PREPARATION | 210 |

| LAYER SSE AND ELECTRODE | 220 |

| CONTACT SSE AND ELECTRODE | 230 |

| APPLY PRESSURE TO SSE AND ELECTRODE | 240 |

| MOLD AND DENSIFY SSE TO ENCAPSULATE ELECTRODE | 250 |

| END | 260 |

400

PREPARATION                                                    410

POSITION ENCAPSULATED ELECTRODE AND
SHEARING DEVICE                                                420

SHEAR ENCAPSULATED ELECTRODE                                  430

REMOVE SHEARING DEVICE                                        440

SEPARATE PARTITIONED MATERIAL                                 450

END                                                           460

PROTECTED ELECTRODE STRUCTURES FOR SOLID-STATE CELLS

CROSS-REFERENCE TO RELATED APPLICATION

This application is related to and claims priority under 35 U.S.C. § 119 from U.S. Provisional Patent Application No. 63/263,370, filed Nov. 1, 2021, entitled "Protected Electrode Structures for Solid-State Cells," the entire contents of which are fully incorporated by reference herein for all purposes.

TECHNICAL FIELD

Various embodiments described herein relate to the field of solid-state primary and secondary electrochemical cells, electrodes and electrode materials, electrolyte compositions, and corresponding methods of making and using these electrochemical cells.

BACKGROUND AND INTRODUCTION

With the ever-increasing adoption of mobile devices, electric automobiles, and the development of Internet-of-Things devices, the need for battery technologies with improved reliability, capacity (Ah), thermal characteristics, lifetime, and recharge performance has never been greater. Solid-state battery cells utilize nonflammable, solid electrolyte in contrast to the flammable, liquid electrolyte used in traditional batteries. Thus, the solid-state battery cells are safer than traditional batteries. However, in some solid-state battery cells, the movement of lithium ions or electrons is hindered because the solid-state interface has increased resistance as compared to traditional batteries with liquid electrolyte.

As an example of the increased resistance of the solid-state interface, International Patent Publication No. WO2012/077197(A1) describes a solid-state battery cell where the various stacked layers that include a positive electrode collector—positive electrode active material layer—solid electrolyte layer—negative electrode active material layer—negative electrode collector are combined by applying pressure to them to form a stack, or in another embodiment, pressing a positive electrode collector—positive electrode active material layer—solid electrolyte layer—negative electrode active material layer—negative electrode collector to form a stack. When this stacking method is employed, significant problems arise within the solid-state battery cell, such as shorting of the cell, increasing cell resistance, and lowering specific cell capacity. The problems within this solid-state battery cell may be due to the solid-state interface between the layers being of poor quality.

Thus, further improvements are needed in solid-state-battery cells, their chemistry, and their manufacture. It is with these observations in mind, among other, that aspects of the present disclosure were conceived.

SUMMARY

This disclosure describes an encapsulated electrode for an electrochemical cell comprising an electrode layer and a solid-state electrolyte composite wherein the solid-state electrolyte composite is in contact with the electrode layer and encapsulates the electrode layer.

In one embodiment, the encapsulated electrode for an electrochemical cell comprises one or more of an electrode active material. In another embodiment of the encapsulated electrode for an electrochemical cell, two or more sides of the electrode layer are encapsulated by the sold-state electrolyte composite.

In another embodiment, the encapsulated electrode for an electrochemical cell comprises one or more of an anode active material or one or more of a cathode active material. In another embodiment, the encapsulated electrode for an electrochemical cell comprises one or more of an alkali metal, an alkaline earth metal, a transition metal or an alloy thereof. In another embodiment, the encapsulated electrode for an electrochemical cell comprises lithium metal or a lithium metal alloy.

In another embodiment of the encapsulated electrode for an electrochemical cell, the electrode layer comprises one or more electrode layers. In another embodiment of the encapsulated electrode for a solid-state electrochemical cell, the solid-electrolyte composite comprises one or more solid-state electrolyte materials.

In another embodiment of the encapsulated electrode for a solid-state electrochemical cell, the solid-state electrolyte composite comprises one or more polymers in an amount of between 0.5% and 80% by weight of the solid-state electrolyte composite. In another embodiment of the encapsulated electrode for a solid-state electrochemical cell, the solid-state electrolyte composite comprises one or more polymers comprising at least one of a thermoplastic elastomer. In one embodiment, the one or more polymers comprise fluorine.

In another embodiment of the encapsulated electrode for a solid-state electrochemical cell, the electrode layer comprises one or more of a solid-state sulfide electrolyte.

In another embodiment, the encapsulated electrode for an electrochemical cell comprises an engineered surface coating comprising one of more of a lithium element, a carbon element, and an oxygen element. In one embodiment, the engineered surface coating has a thickness of 1 nm to 100 μm.

In another embodiment, the encapsulated electrode for an electrochemical cell comprises an encapsulated anode or an encapsulated cathode.

This disclosure also describes a method for manufacturing an encapsulated electrode for a solid-state electrochemical cell comprising providing an electrode to be encapsulated, positioning the electrode to be encapsulated between two layers of solid-state electrolyte composite, and compressing the two layers of solid-state electrolyte composite to contact and encapsulate the electrode.

In another embodiment of the method, the compressing includes applying pressure in the range of 100 to 400,000 PSI thereby causing the solid-state electrolyte composite to densify and deform to cover one or more surfaces of the electrode to be encapsulated.

The present disclosure also describes an encapsulated electrode for an electrochemical cell comprising an electrode layer with a first face, a second face, and a peripheral surface; a first layer of solid-state electrolyte composite in contact with and extending beyond a boundary of the first face of the electrode layer; a second layer of solid-state electrolyte composite in contact with and extending beyond a boundary of the second face of the electrode layer, wherein portions of the first layer and second layer of solid-state electrolyte composite that extend beyond boundaries of the first face and second face of the electrode layer are in contact and fully encapsulate the electrode, and wherein portions of the solid-state electrolyte composite extending beyond boundaries of the first face and second face of the electrode layer have a lower density than that of portions of the solid-state electrolyte composite within boundaries of the first and second faces.

In one embodiment of the encapsulated electrode, the electrode layer comprises one or more of an electrode active material comprising lithium metal or lithium alloy. In another embodiment of the encapsulated electrode, the electrode layer comprises an anode capable of conducting alkali metal ions.

In one embodiment of the encapsulated electrode, the electrode layer comprises a current collector comprising stainless steel or copper foils.

In one embodiment of the encapsulated electrode, the anode comprises an engineered coating.

The present disclosure provides a solid-state battery cells with improved solid-state interfaces between the positive electrode layer—solid electrolyte layer and between the negative electrode layer—solid electrolyte layer. Additionally, the present application discloses a novel cell architecture, which enhances cycle life, specific cell capacity, and lower cell resistance.

BRIEF DESCRIPTION OF THE DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION

Aspects of the present disclosure involve an encapsulated electrode structure and methods of manufacturing the same. Aspects disclosed herein may provide for a technique whereby densification of the electrode structure may be enhanced and more uniform resulting in beneficial improvements in the performance of the electrode, and battery within which the electrode is included. Aspects of the disclosure may provide for the ability to better work with soft electrode materials such as electrodes including Lithium layers. For example, by encapsulating the relatively softer electrode in relatively harder electrolyte material prior to densification, the relatively softer electrode material is captured by the surrounding electrolyte blocking extrusion of the electrode material under possibly high densification pressures. These and other advantages of various aspects of the present disclosure are described in more detail below.

In the following description, specific details are provided to impart a thorough understanding of the various embodiments of the technology. Moreover, to avoid obscuring the technology, some well-known methods, processes, devices, and systems finding application in the various embodiments described herein are not disclosed in detail.

The term "battery" in the art and herein can be used in various ways and may refer to an individual cell having an anode and cathode separated by an electrolyte, which may be a solid electrolyte, as well as a collection of such cells connected in various arrangements. A solid-state electrolyte cell may include more than one anode and cathode, separated by solid electrolyte layers, and may be ultimately encased within a flexible "pouch" that accommodates the expansion and contraction of the anode and cathode as the cell charges and discharges. Although many examples are discussed herein as applicable to a battery or a discrete cell, it should be appreciated that the systems and methods described may apply to many different types of batteries, battery chemistries, and may range from an individual cell to batteries involving different possible interconnections of cells such as cells coupled in parallel, series, and parallel and series. The various implementations discussed herein may also apply to different structural battery arrangements including pouch cells and other cell structures that may accommodate size changes in the electrodes, whether the anode or the cathode or both.

Figures 1A, 1B:
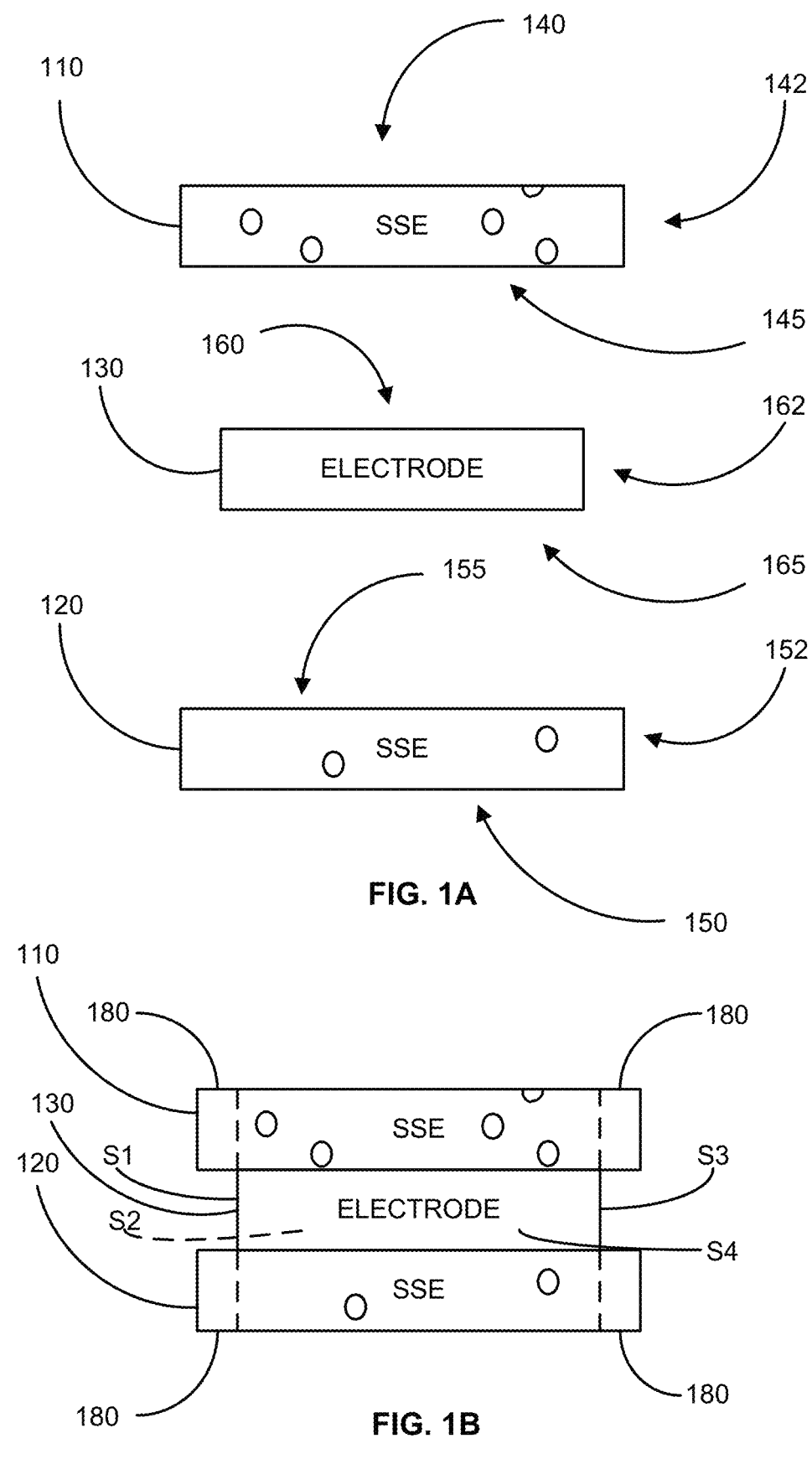
FIG. 1A shows the proposed arrangement of one embodiment of the encapsulated electrode structure 105 before assembly.
FIG. 1B shows the proposed arrangement of one embodiment of the encapsulated electrode structure 105 after the three layers are assembled wherein the outer boundary of the first SSE 170 and the outer boundary of the second SSE 180 are both longer than the electrode 130 and are not attached to the electrode.
Figure 1C:
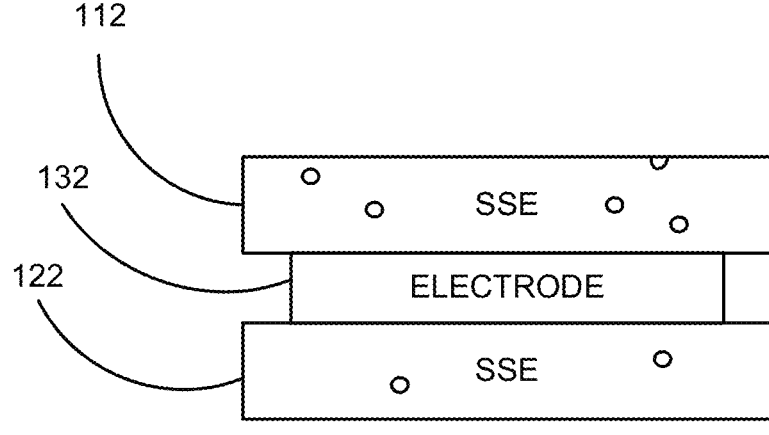
FIG. 1C illustrates the proposed arrangement of one embodiment of the encapsulated electrode structure 105 after the three layers are assembled and pressure is applied to the arrangement.
Figure 1D:
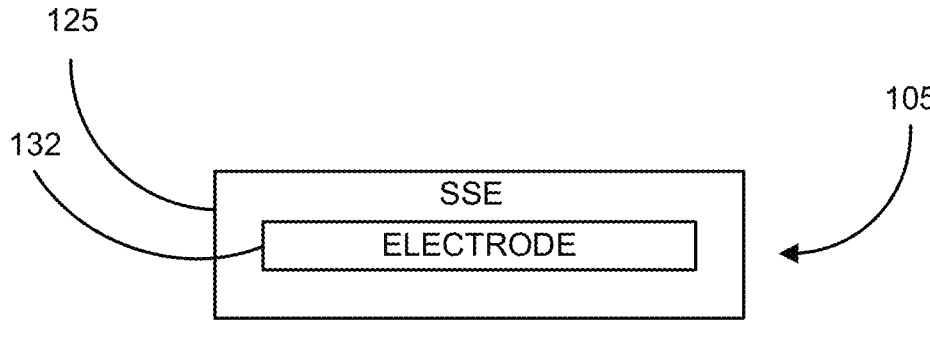
FIG. 1D shows the encapsulated electrode structure 105 after the continued application of pressure is applied to the arrangement, so that the SSE 110 and SSE 120 come in contact to form a unified SSE 125, which encloses or encapsulates the electrode 135.
Figure 2:
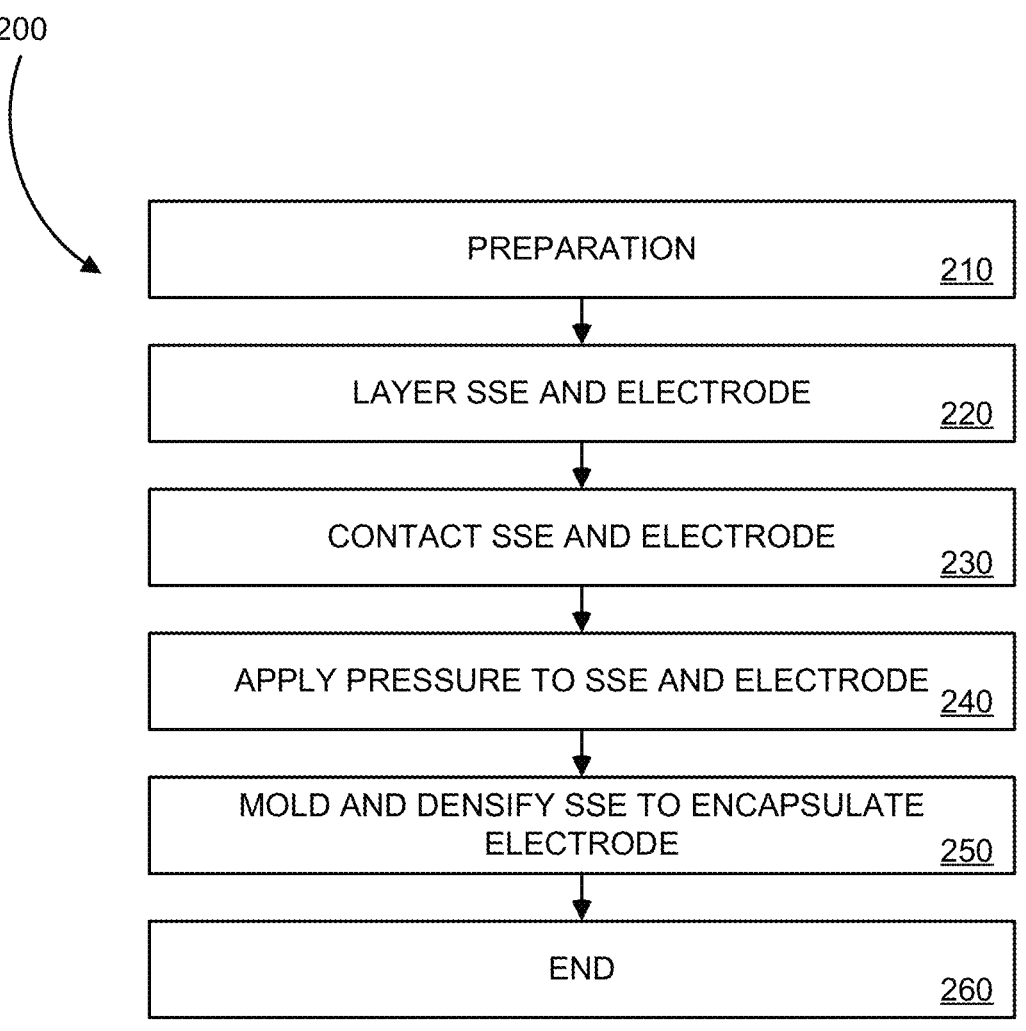
FIG. 2 is a flow chart for a process for forming an encapsulated electrode structure.

FIGS. 1A-1D are a set of pictorial representations of process steps for forming encapsulated electrode structure 105 that are associated with process 200 of FIG. 2. The representations illustrated in FIGS. 1A-1D are representative section views. FIG. 1A shows the proposed arrangement of one embodiment of the encapsulated electrode structure 105 before assembly of the three layers that will form the encapsulated electrode. One layer of the encapsulated electrode structure 105 is a first solid-state electrolyte composite (SSE) 110 that has a top surface 140, a bottom surface 145, and a peripheral surface 142. The SSE layer may also be referred to as a separator layer. The peripheral surface is the surface defining an edge between the upper and lower surface. Reference to top and bottom here is from the perspective of the structure illustrated in the figures, and is done for the convenience of the reader. It is possible that a manufacturing technique might present the layers in other arrangements such that the top might be considered the bottom, the bottom considered the top, and the like. Another layer of the encapsulated electrode structure is the electrode 130 that has a top (first) surface 160, a bottom (second) surface 165, and a peripheral surface 162. Yet another layer of the encapsulated electrode structure 105 is a second SSE 120 that has a top surface 155, a bottom surface 150, and a peripheral surface 152. The first SSE 110 is arranged so as to be operably coupled with the electrode 130, wherein the bottom surface of the first SSE 145 is to be operably coupled with the top surface of the electrode 160. The bottom surface of the electrode 165 is to be operably coupled with the top surface of the second SSE 155.

In some embodiments, the length of the each of the SSE 110 and SSE 120 can be the same or different and can range from 5 millimeters to 1 meter. In another embodiment, the range of lengths is 1 cm to 500 cm. In yet another embodiment, the range of lengths is 2 cm to 100 cm. In a further embodiment, the range of lengths is 2 cm to 50 cm. In another embodiment, the range of lengths is 3 cm to 30 cm. In some embodiments, the length of the each of the SSE 110 and SSE 120 can be the same length of the electrode or longer length than that of the electrode 130. In another embodiment, one of the SSE 110 or 120 can be slightly shorter than the length of the electrode 130 and the other SSE 110 or 120 can be longer than the length of the electrode 130.

In some embodiments, the widths of the each of the SSE 110 and SSE 120 can be 5 millimeters to 1 meter. In another embodiment, the widths of the each of the SSE 110 and SSE 120 can be 1 cm to 500 cm. In yet another embodiment, the widths of the each of the SSE 110 and SSE 120 can be 2 cm to 100 cm. In a further embodiment, the widths of the each of the SSE 110 and SSE 120 can be 2 cm to 50 cm. In another embodiment, the widths of the each of the SSE 110 and SSE 120 can be 3 cm to 30 cm. In some embodiments, the widths of the each of the SSE 110 and SSE 120 can be the same as the width of the electrode or of greater width than that of the electrode 130.

In some embodiments, the height of the each of the SSE 110 and SSE 120 can be 1 micron to 1 mm. In another embodiment, the height of the each of the SSE 110 and SSE 120 can be 5 microns to 500 microns. In yet another embodiment, the height of the each of the SSE 110 and SSE 120 can be 10 microns to 250 microns. In a further embodiment, the height of the each of the SSE 110 and SSE 120 can be 15 microns to 200 microns. In another embodiment, the height of the each of the SSE 110 and SSE 120 can be 20 microns to 100 microns. In some embodiments, the height of the each of the SSE 110 and SSE 120 can be the same as the height of the electrode or of longer height than that of the electrode 130.

FIG. 1B shows the proposed arrangement of one embodiment of the encapsulated electrode structure 105 after the three layers (SSE 110, electrode 130 and SSE 120) are assembled wherein the outer boundary of the first SSE 170 and the outer boundary of the second SSE 180 exceed the length of the electrode 130 and as such are not attached to the electrode. In an alternative embodiment, at least one of the first SSE 170 and the second SSE 180 is the same length as the electrode and the other of the first SSE 170 and the second SSE 180 is substantially longer than the electrode 130.

While various techniques for lamination and densification are possible, in one example, the layers of the protected electrode are run through a calendar press. In one example, producing an encapsulated electrode comprises a stack of a center electrode layer, solid-state electrolyte (SSE) layers, and carrier film layers (such as an aluminum foil layer), which is removed prior to use in a cell. The aluminum carrier layers are not illustrated in FIGS. 1A-1D. In one implementation, the center electrode layer may be lithium foil and the layers may be arranged initially in an Aluminum-SSE-Lithium-SSE-Aluminum stack. The SSE layer may comprise a sulfide-based solid electrolyte material and binder cast onto the aluminum foil. To laminate and otherwise operably couple the lithium foil layer to the SSE layers, the stack may be fed through a calendar press device comprising a first roller and a second roller. The rollers exert a compressive force on the stack to laminate the layers together while also reducing the porosity of the materials within the stack (densifying), enhancing material contact within and between the layers, causing some layers to adhere or otherwise laminate, and/or also causing some layers to partially or completely separate (e.g., the outer aluminum foil layers). The pressure applied to the stack by the calendar press may correlate to a spacing between the first roller and the second roller.

Figures 6A, 6B, 6C, 6D:
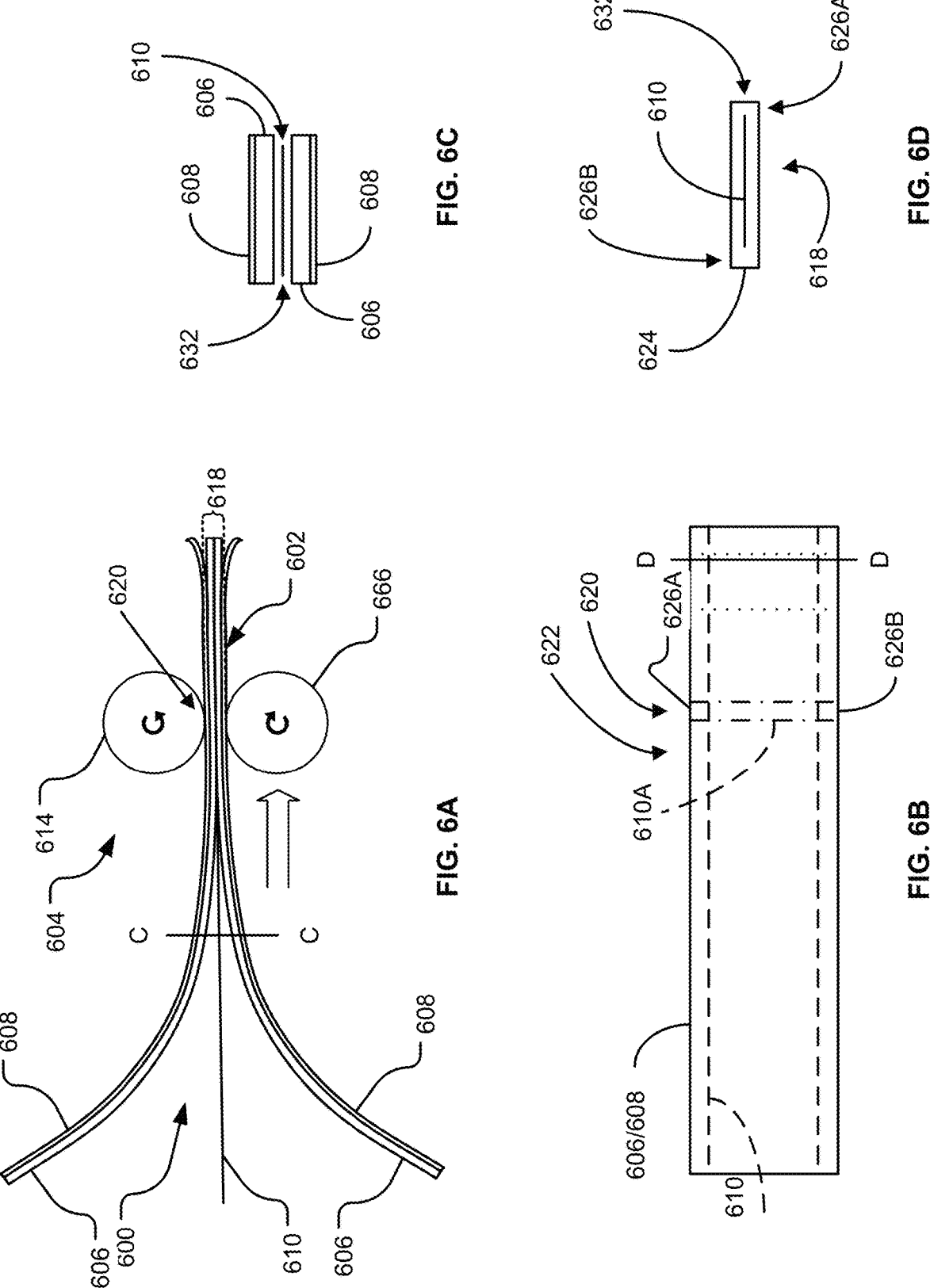
FIG. 6A is a side view of a calendaring device and process of forming a protected electrode.
FIG. 6B is a top view of an SSE/electrode/SSE stack of FIG. 6A.
FIG. 6C is a section view of the SSE/electrode/SSE stack of FIG. 6A taken along line C-C.
FIG. 6D is a side section view of the SSE/electrode/SSE stack of FIG. 6A at 618.

FIG. 6A is a diagram illustrating manufacturing a solid-state protected electrode laminate 602 using a calendar press device 604, according to aspects of the present disclosure. In one implementation, the protected solid-state electrode laminate 602 may include two separator layers of a composite blend of a solid-state electrolyte (SSE) and a binder. The SSE 606 may be coated as a thin layer on a carrier film 608. In one example, the carrier film 608 may be an aluminum foil, although other materials may be used. A thin foil of lithium metal 610 may be placed between two facing SSE layers 606. To generate a protected electrode (e.g., anode) stack, two different sheets of the SSE 606 on foil 608 may be oriented such that the SSE layers are facing each other with the lithium metal layer 610 between the two SSE sheets. Other combinations of layers and compositions of layers may be used for other types of stacks, such as a cathode stack. In this implementation, the layers forming the electrode stack 602 are fed between the calendar rollers 614, 616 in an Aluminum-SSE-Lithium-SSE-Aluminum stack. When assembled into a cell, the protected anode is comprised of the SSE-Lithium-SSE stack where the aluminum foil has been removed. The composite SSE layers 606 in this configuration may conduct ions, but not electrons, during use in a battery cell such that the SSE layers provide electrical isolation for the middle lithium anode material of layer 610. The respective rollers of the calendar press 604 are spaced apart a distance less than the pre-calendared stack thickness such that pressure on the stack being fed between the calendar rollers 614, 616 may reduce the porosity of the materials within the stack, enhance material contact, cause some layers to adhere or bond, and/or cause the SSE layers 606 to partially or completely separate from the aluminum foil 608 while laminating to the lithium foil 610 layer. It should be recognized that in some instances, the calendar press does not delaminate the outer foil layer and a subsequent delamination operation may be used. In other instances, the calendaring process weakens the SSE adhesion to the outer foil making subsequent removal more efficient. The pressure exerted by the calendar rollers 614, 616 on the stack may be adjusted through a calendar controller 612 configured to adjust the space between the calendar rollers. Upon removal of the aluminum foil 608 from the stack, an SSE-Li-SSE stack is produced that may then be used as an anode in an electrochemical cell. Other stacks may include the same or different types of layers or compositions of layers for use in an electrochemical cell.

FIG. 6B is a top view of the various sheets forming the protected electrode stack noting that the electrode, e.g., lithium layer, is inset (e.g., lesser width) from the outer edges of the SSE sheets. A first 626A and a second 626B region of the upper and lower SSE layers are laminated and densified between the calendar rollers, and forming protective boundaries to a portion of the electrode layer 610A between the regions 626A/626B. FIG. 6C is a section view at C-C of the stack prior to calendaring and FIG. 6D is a side section of the protected electrode stack after calendaring at point 618 emphasizing the inner electrode layer is inset from the respective edges of the SSE layers. From the perspective of FIG. 6B it can be seen that the side edges of the electrode layer are inset from the side edges of the respective SSE layers.

Figure 6E:
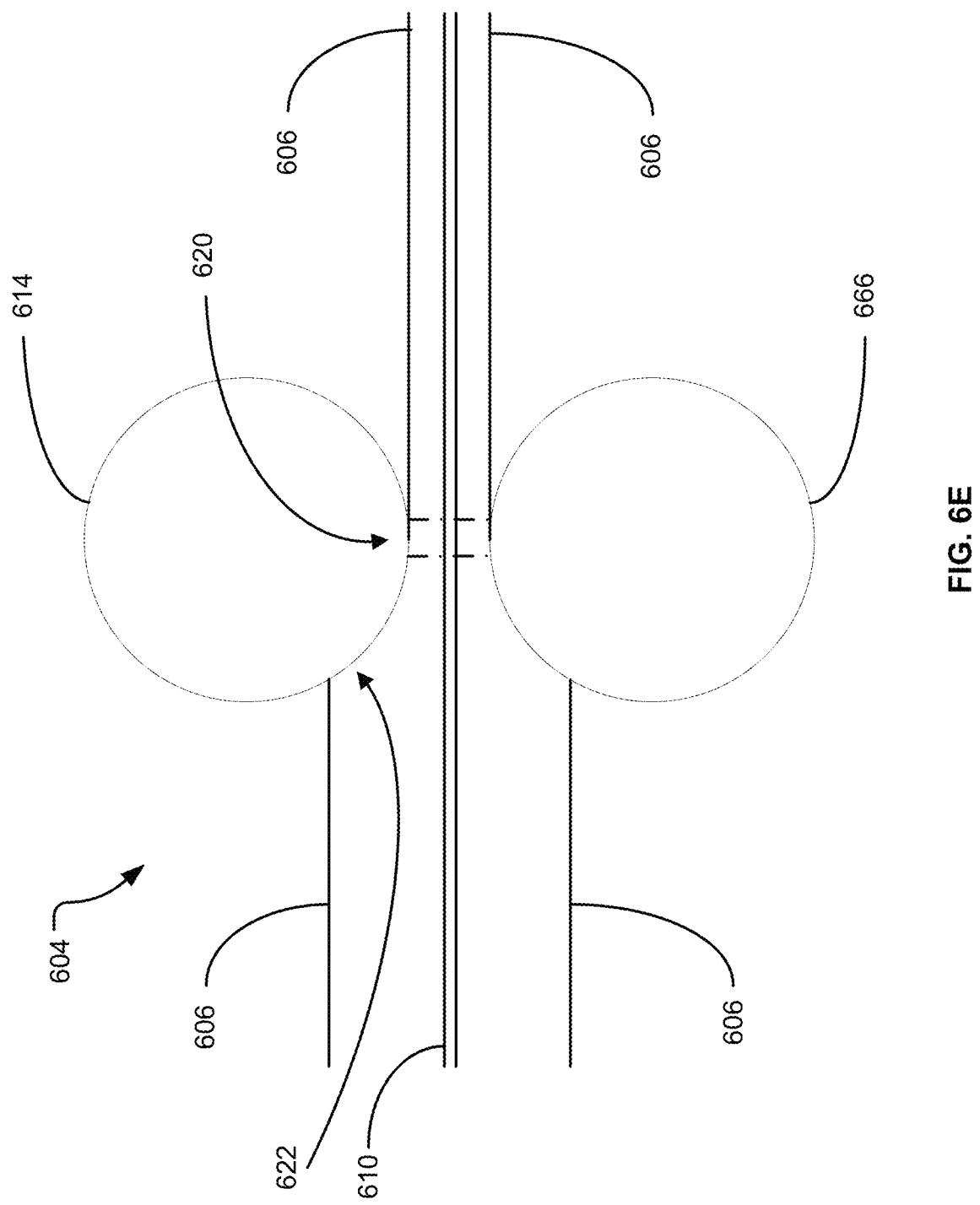
FIG. 6E is a side view of the SSE/electrode/SSE stack undergoing densification by way of calendar rollers.

FIG. 6E is a close up view of the calendaring rollers 614 and 666, and showing how a stack SSE 606/electrode 610/SSE 606 is laminated/densified using the rollers. The view in FIG. 6E does not illustrate the aluminum foil 608 layers. FIG. 6E further illustrates a way of generating a progressing protective boundary to the electrode 610. As the sheets are fed between the calendar press, the previously densified portion (or the portion undergoing densification) at 620 of the electrode layer is immediately adjacent a portion 622 of the electrode layer between the rollers and undergoing densification. The previously densified stack thus forms a protective boundary at the leading edge of the portion of the electrode undergoing densification thus providing a third boundary 620, in addition to those at the sides of the sheet where the width of the upper and lower SSE layers exceeds the width of the electrode layers, enhancing densification as the stack proceeds between the rollers. It should be noted that electrode layer in some instances is not densified due to the characteristics of the material. For example, in the case of a Lithium electrode layer, the SSE layers are densified but the metal Lithium layer does not densify. The Lithium layer may, however, extrude or flow, as noted herein, under densification pressures. Conversely, for example, non-metal anode electrode layers, such as Silicon composite, graphite composite, or the like, or cathode layers, such as NMC composite, Pyrite composite, Sulfur composite, or the like, do densify.

FIG. 1C illustrates the proposed arrangement of one embodiment of the encapsulated electrode structure 105 after the three layers (SSE 110, electrode 130 and SSE 120) are laminated and pressure is applied to the arrangement. As pressure is applied, the SSE 110 and SSE 120 start to become compacted and densified to form SSE 112 and SSE 122, which form around the electrode 132, which may have also become compacted and densified. As noted elsewhere, some electrode materials such as Lithium do not densify whereas other electrode materials, e.g., non-metals, do densify. In a calendaring operation with cylindrical rollers, the initial compaction and densification shown in FIG. 1C occurs as the stack is first fed between the rollers and the final compaction and densification shown in FIG. 1D occurs at the area of highest densification pressure where the separation between the upper and lower rollers is least.

FIG. 1D shows the encapsulated electrode structure 105 after the continued application of pressure is applied to the arrangement, so that the SSE 110 and SSE 120 have come in contact with each other to form a unified SSE 125, which encloses electrode 135. Referring again to FIG. 6D, it can be seen that a unified SSE 624 is formed around along the sides 632 of the electrode 610, after the stack proceeds through the densification step at the rollers in the example of using a calendar press.

An encapsulated electrode structure may refer to an electrode or electrode layer 130 that is enclosed in a solid electrolyte material SSE or one or more solid electrolyte layers SSE, such that the first (e.g., upper) and second (e.g., lower) surfaces of the electrode are laminated to the respective adjacent SSE layers and the lateral sides of the electrode or electrode layer are in contact with the solid electrolyte materials of the upper and lower layers that is pressed together to encapsulate the electrode edges inset from the respective area where the upper and lower SSE layers contact each other during densification. The electrode may be exposed at least one edge side of the assembled stack as will be discussed in more detail below.

In some embodiments, an encapsulated electrode structure may refer to an electrode or electrode layer that is enclosed in a solid electrolyte material along at least two edges or sides when referring to a rectangular shaped electrode. When encapsulated, the electrode layer is between solid state electrolyte layers such that all faces and at least one side of the electrode or electrode layer are in contact with a solid electrolyte material or one or more solid electrolyte layers. In another embodiment, the encapsulated electrode structure may refer to an electrode or electrode layer that is enclosed in a solid electrolyte material or one or more solid electrolyte layers such that all faces and at least two sides of the electrode or electrode layer are in contact with a solid electrolyte material or one or more solid electrolyte layers. In yet another embodiment, the encapsulated electrode structure may refer to an electrode or electrode layer that is enclosed in a solid electrolyte material or one or more solid electrolyte layers such that all faces and at least three sides of the electrode or electrode layer are in contact with a solid electrolyte material or one or more solid electrolyte layers. In yet a further embodiment, the encapsulated electrode structure may refer to an electrode or electrode layer that is enclosed in a solid electrolyte material or one or more solid electrolyte layers such that all faces and all but two sides of the electrode or electrode layer are in contact with a solid electrolyte material or one or more solid electrolyte layers. The side or sides of the electrode not enclosed by solid electrolyte may provide an electrical contact to the electrode for forming the electrode into a battery.

Referring again to FIG. 1B, after densification and the foil removed, the protected electrode, e.g., anode, may be formed by trimming the SSE-Li-SSE stack of sheets into discrete sections. The dotted lines set out in FIG. 1B illustrate where such trimming may occur. As can be seen, the upper and lower edges (faces) of the electrode are encapsulated by the SSE layers whereas the leading and trailing edges (faces) of the electrode are exposed after trimming. As can be seen in FIG. 1D, the upper and lower surfaces of the electrode are also encapsulated by the respective upper and lower SSE layers.

When forming an encapsulated anode, electrode 130 may be free standing with a thickness in the range of 1 μm to 1 mm. A free standing anode is one that does not have an "attached" or separate current collector. In examples discussed herein, when the anode is made of Lithium or an alloy of lithium, the Lithium is the active material powering the cell and the current collector.

An example of not free standing is when the active material is placed on a current collector such as Lithium deposited onto a copper foil. In some embodiments, the thickness of the anode is in the range of 2 μm to 750 μm. In another embodiment, the thickness of the anode is in the range of 3 μm to 500 μm. In another embodiment, the thickness of the anode is in the range of 4 μm to 250 μm. In another embodiment, the thickness of the anode is in the range of 5 μm to 150 μm. In another embodiment, the thickness of the anode is in the range of 5 μm to 100 μm. In another embodiment, the thickness of the anode is in the range of 5 μm to 75 μm. In another embodiment, the thickness of the anode is in the range of 5 μm to 50 μm. In another embodiment, the thickness of the anode is in the range of 5 μm to 45 μm. In yet another embodiment, the thickness of the anode is in the range of 5 μm to 35 μm. In another embodiment, the thickness of the anode is in the range of 1 μm to 15 μm.

In some embodiments of the encapsulated anode, electrode 130, may contain multiple layers of one or more materials. In some embodiments, 2 to 10 layers may be used. In another embodiment, 2 to 5 layers may be used.

In a further embodiment, the encapsulated anode may be or include a current collector such as but not limited to stainless steel and copper foils. In one embodiment, the encapsulated electrode comprises 3-10 current collectors. The encapsulated anode may be one or more anode active materials in contact with one or more sides of a current collector, with examples of the active materials being Silicon containing materials (Si, $SiO_2$, Si-Lithium alloys, Si—Na alloys), Carbon containing materials (Graphite, graphene, carbon black, etc.), Aluminum, Magnesium, Tin, Germanium, and Titanium containing such as LTO ($Li_4Ti_5O_{12}$).

In some applications it may be necessary for one or more materials contained in the encapsulated anode to have an engineered coating on one or more of its faces. In some embodiments, one or more of the anode active materials has an engineered coating. In another embodiment, one or more of the current collectors has an engineered coating. In yet another embodiment, the engineered coating may be one or more of a carbon-based material for example but not limited to graphite, graphene, carbon nanotubes, and carbon black. In a further embodiment, the carbon-based coating may be a composite containing one or more of a material capable of alloying with an alkali metal for example but not limited to Au, Ag, Zn, Zr, In, Ge, Si, Sn, or Al. In another embodiment, the engineered coating may be one or more of an oxygen-containing-species for example but not limited to $Li_2CO_3$, $Li_2O$, $Li_2SO_4$, $Na_2CO_3$, $Al_2O_3$, $ZrO_2$, or $SiO_2$. In yet another embodiment, the engineered coating may be one or more of a sulfide-containing-species for example but not limited to Elemental Sulfur, CuS, $CuSO_4$, NiS, $NiSO_4$, or $FeS_2$. In a further embodiment, the engineered coating may be one or more nitrogen-containing-species for example but not limited to $LiNO_3$, $Li_3N$, $Li_2NH$, $LiNH_2$, LiCN, $NaNO_3$, $AgNO_3$, or $Cu(NO_3)_2$. In a further embodiment, the engineered coating may be one or more halogen-containing-species for example but not limited to LiF, LiCl, LiBr, NaF, KF, $Li_{0.5}Na_{0.5}F$, $Li_{0.5}Na_{0.5}Cl$, $Na_{0.5}K_{0.5}F$, $Na_{0.5}K_{0.5}Cl$, $MgF_2$, $CaF_2$, or AgF. In yet another embodiment the engineered coating may be one or more phosphorous-containing-species for example but not limited to $Li_3PO_4$, $P_2S_5$, or $P_2O_5$. In another embodiment, the engineered coating may be one or more polymers for example but not limited to a polymer comprising styrene, butadiene, one or more halogens, sulfur, or nitrogen.

In the engineered coating of the encapsulated anode, electrode 130 may have a thickness that ranges from 1 nm to 100 μm. In some embodiments, the thickness ranges from 50 μm to 75 μm. In another embodiment, the thickness ranges from 1 μm to 50 μm.

Similar to the formation of an encapsulated anode, in the formation of an encapsulated cathode, a suitable electrode and appropriate solid-state electrolyte composite 110 and 120 may be prepared. As with the single or multiple layers that may be used as electrode 130 when an encapsulated anode is formed, a multilayer structure may be used when an encapsulated cathode is formed. For example, a multilayer structure such as one or more cathode active materials in contact with one or more sides of a current collector may be used as electrode 130. To encapsulate this multilayer electrode structure, solid-electrolyte composite 110 and 120 may be applied as would be done for an anode electrode. In this multilayer structure the cathode active material may be a NMC material (material containing Nickel, Manganese and Cobalt), for example but not limited to, NMC 111 ($LiNi_{0.33}Mn_{0.33}Co_{0.33}O_2$), NMC 433 ($LiNi_{0.4}Mn_{0.3}Co_{0.3}O_2$), NMC 532 ($LiNi_{0.5}Mn_{0.3}Co_{0.2}O_2$), NMC 622 ($LiNi_{0.6}Mn_{0.2}Co_{0.2}O_2$), or NMC 811 ($LiNi_{0.4}Mn_{0.1}Co_{0.1}O_2$). In another embodiment, the cathode active material may be a different element-substituted Li—Mn spinels for example but not limited to, Li—Mn—Ni—O, Li—Mn—Al—O, Li—Mn—Mg—O, Li—Mn—Co—O, Li—Mn—Fe—O or Li—Mn—Zn—O. In another embodiment, the cathode active material may be a lithium metal phosphate for example but not limited to $LiFePO_4$, $LiMnPO_4$, $LiCoPO_4$ or $LiNiPO_4$. In another embodiment, the cathode active material may be one or more of a $LiCoO_2$ or NCA (material containing Nickel, Cobalt, Aluminum) (e.g., $LiNi_{0.8}Co_{0.15}Al_{0.05}O_2$). In another embodiment, the cathode active material may be one or more of a conversion cathode such as S, $Li_2S$, $TiS_2$, $MoS_2$, $VS_2$, $CrS_2$, $FeS_2$, $FeF_2$, $FeF_3$, $CuF_2$, or MnO. Furthermore, in this multilayer structure the current collector may be aluminum, stainless steel, copper, or nickel.

When forming an encapsulated cathode, the thickness of the cathode may be in the range of 1 μm to 1000 μm. In some embodiments, the thickness of the cathode is in the range of 3 μm to 900 μm. In another embodiment, the thickness of the cathode is in the range of 5 μm to 800 μm. In another embodiment, the thickness of the cathode is in the range of 10 μm to 700 μm. In another embodiment, the thickness of the cathode is in the range of 12.5 μm to 600 μm. In another embodiment, the thickness of the cathode is in the range of 15 μm to 500 μm. In another embodiment, the thickness of the cathode is in the range of 17.5 μm to 400 μm. In another embodiment, the thickness of the cathode is in the range of 20 μm to 300 μm. In another embodiment, the thickness of the cathode is in the range of 22.5 μm to 200 μm. In yet another embodiment, the thickness of the cathode is in the range of 25 μm to 100 μm. In another embodiment, the thickness of the cathode is in the range of 25 μm to 75 μm.

Solid-state electrolyte composite 110 and 120 may include a sulfide solid-state electrolyte and one or more binders, which may be in the form of polymers where solid-state electrolyte composites 110 and 120 may be 0% to 80% polymer by weight of the composite. In another embodiment, the polymer can be 1% to 70% by weight of the composite. In another embodiment, the polymer can be 3% to 60% by weight of the composite. In another embodiment, the polymer can be 4% to 50% by weight of the composite. In another embodiment, the polymer can be 5% to 40% by weight of the composite. In another embodiment, the polymer can be 10% to 30% by weight of the composite.

The polymer in the solid-state electrolyte composite 110 and 120 may be one or more of a fluorine-containing polymer for example but not limited to polytetrafluoroethylene (PTFE), polyvinylene difluoride (PVdF), poly (vinylene difluoride-hexafluoropropylene) copolymer (PVdF-HFP), and the like. In another embodiment, a thermoplastic-elastomer may be used, for example but not limited to, styrene-butadiene rubber (SBR), styrene butadiene styrene copolymer (SBS), styrene isoprene copolymer (SIS), poly-acrylonitrile (PAN), nitrile-butylene rubber (NBR), polybutadiene, polyisoprene, Poly (methacrylate) nitrile-butadiene rubber (PMMA-NBR) and the like. In another embodiment, an acrylic resin may be used, for example but not limited to, polymethyl (meth) acrylate, polyethyl (meth) acrylate, polyisopropyl (meth) acrylate polyisobutyl (meth) acrylate, polybutyl (meth) acrylate, or the like. In another embodiment, a polycondensation polymer may be used, for example but not limited to, polyurea, polyamide paper, polyimide, polyester, or the like or combinations thereof.

Solid-state electrolyte composite 110 and 120 may include one or more sulfide solid-state electrolytes comprising one or more of a lithium-containing-element, a phosphorous-containing-element or a sulfur-containing-element. In another embodiment, the solid-state electrolyte composite 110 and 120 may include one or more oxysulfide solid-state electrolytes comprising one or more of a lithium-containing-element, a sulfur-containing-element or an oxygen-containing-element. In another embodiment, the solid-state electrolyte composite may comprise one or more of a halogen such as F, Cl, Br, or I. In another embodiment, the solid-state electrolyte composite may comprise one or more of a pseudo-halogen such as but not limited to CN, OH, SH, SCH, NH, $NH_2$, $NO_3$, $BF_4$, or $BH_4$.

Examples of sulfide solid electrolytes may include but are not limited to one or more of $Li_2S$—$P_2S_5$ $Li_2S$—$P_2S_5$—LiX, $Li_2S$—$SiS_2$, $Li_2S$—$SiS_2$—LiX, $Li_2S$—$SiS_2$—$P_2S_5$, $Li_2S$—$SiS_2$—$P_2S_5$—LiX $Li_2S$—$SiS_2$—$B_2S_3$—LiX. $Li_2N$—$P_2S_5$, $Li_3N$—$Li_2S$—$P_2S_5$—LiX and $Li_2S$—$B_2S_3$ where the components of each are mixed in a glass or glass ceramic forming ratio. Examples of an oxysulfide solid electrolytes may include one of more of $Li_2S$—$P_2O_5$, $Li_2S$—$P_2O_5$—LiX, $Li_2PO_4$—$P_2S_5$—LiX, $Li_2S$—$P_2S_5$—$Li_2O$, and $Li_2S$—$P_2S_5$—$Li_2O$—LiX where the components of each are mixed in a glass or glass ceramic forming ratio. In some embodiments, $Li_2S$—$P_2S_5$ may represent one or more of a $Li_3PS_4$, $Li_4P_2S_6$, $Li_7PS_6$ and $Li_7P_3S_{11}$. In some embodiments, $Li_2S$—$P_2S_5$—LiX may represent one or more of $Li_{7-y}PS_{6-y}$—$X_y$ where 0<y≤2 and X may be one or more halogen and or pseudo-halogen. In another embodiment, $Li_2S$—$P_2S_5$—LiX may represent $Li_7P_2S_8X$ where X may be one or more halogen or a pseudo-halogen. In another embodiment, $Li_2S$—$P_2S_5$—LiX may represent $Li_8P_3S_{11}X$ where X may be one or more halogen or a pseudo-halogen.

Additionally, the solid-state electrolyte material may vary in its structural makeup. In some embodiments, the solid-state electrolyte material may have a glass or glassy structure. In another embodiment, the solid-state electrolyte material may have a crystalline structure. In another embodiment, the solid-state electrolyte material may have a ceramic structure. In another embodiment, the solid-state electrolyte material may have a glassy ceramic structure.

One kind of solid electrolyte can be used alone, or two or more kinds of solid electrolytes can be used. In a case where two or more kinds of solid electrolytes are used, the two or more kinds of solid electrolytes may be mixed together, or each of the two or more kinds of solid electrolytes may be formed into two or more layers such that a multilayer structure is established.

The solid-state electrolyte composite 110 and 120 may include one or more materials other than a sulfide electrolyte or polymer. In some embodiments the material other than a sulfide electrolyte or polymer may be one or more of a lithium salt for example but not limited to $LiPF_6$, $LiBF_4$, $LiClO_4$, $LiN(CF_3SO_2)_2$, $LiN(FSO_2)_2$, or LiN ($CF_3CF_2SO_2$). In another embodiment the material other than a sulfide electrolyte or polymer may be one or more of an oxide for example but not limited to $ZrO_2$ or $Al_2O_3$.

In some embodiments the solid-state electrolyte composite layer 110 and 120 may be one or more of an electronically insulating material or electronically conducting layer. In another embodiment the solid-state electrolyte composite 110 and 120 may be referred to as an ion conducting material or ion conducting layer.

The composition of solid-state electrolyte composite 110 and 120 should be formulated such that solid-state electrolyte composite 110 and 120 may suitably deform and densify when pressure is applied to it. The deformation and densification properties may be defined according to predetermined values for Poisson ratio, viscosity, density, etc. Furthermore, viscous response of solid-state electrolyte composite 110 and 120 may be defined by predetermined responses such as shear-thinning, shear-thickening, thixotropic, power law responses. Additionally, one or more relationships between the properties of solid-state electrolyte composite 110 and 120 and electrode 130 may be defined and used for control. Additionally, solid-state electrolyte composite 110 and 120 should provide sufficient adhesion to electrode 130 and self-adhesion to support formation of encapsulated electrode 105. Properties of solid-state electrolyte composite 110 and 120 and electrode 130 such as tack, surface energy, and wetting characteristics may be defined and used for control of process. Solid-state electrolyte composite 110 and 120 may include various volume and surface defects (indicated, for example, by open voids on the surface of and within solid-state electrolyte composite 110). These defects, if not removed, may lead to decreased lifetime or other performance issues with an electrochemical cell constructed therefrom. Additionally, solid-state electrolyte composites 110 and 120 may differ in various properties and/or composition. In addition to the previously mentioned thickness and material description, surface finish, ductility, malleability, mechanical stiffness (modulus of elasticity), the yield strength, elongation to failure, toughness, adhesion, and compression set may be predetermined and used for control of process. As illustrated through the progression of FIGS. 1A to 1D, the various voids and surface defects are reduced in size or effectively eliminated after densification.

The dimensions of the solid-state electrolyte composite layer 110 and 120 should be such that when the solid-state electrolyte composite layer 110 and 120 is in contact with the electrode 130 that the boundary of the first face 145 and of the second face 140 of the solid-state electrolyte composite layer 110 and 120 extends beyond the boundary the first face 160 and second face 160 of the electrode 130.

In some embodiments, the dimensions of the solid-state electrolyte composite layer 110 and 120 should be such that when the solid-state electrolyte composite layers 110 and 120 are in contact with the electrode 130, the peripheral face 142 of solid-state electrolyte composite layer 110 and the peripheral face 152 of solid-state electrolyte composite layer 120 extends beyond the peripheral face 162 of the electrode 130.

Peripheral face may be used to refer to at least two faces that are substantially perpendicular to the first and second face of the electrode layer or solid-state electrolyte composite layer. In some embodiments, peripheral face may be used to refer to each individual side of the electrode layer or solid-state electrolyte composite layer that is substantially perpendicular to the first and second face of the electrode layer or solid-state electrolyte composite layer.

The section of the solid-state electrolyte composite layer 110 that, when in contact with the electrode 130, extends beyond the boundary of the first face 160 of electrode layer 130 may be referred to as the solid-state electrolyte composite layer outer edge 170 (FIG. 1B). In some embodiments, the solid-state electrolyte composite layer outer edge 170 can be expressed by the difference between the width of the first face 145 of the solid-state electrolyte composite layer 110 and the width first face 160 of the electrode 130 when the solid-state electrolyte composite layer 110 and the electrode 130 are in contact or electrical contact. In another embodiment, the solid-state electrolyte composite layer outer edge 170 can be expressed by the difference between the length of the first face 145 of the solid-state electrolyte composite layer 110 and the length of the first face 160 of the electrode 130 when the solid-state electrolyte composite layer 110 the electrode 130 are in contact or electrical contact. The section of the solid-state electrolyte composite layer 120 that, when in contact with the electrode 130, extends beyond the boundary of the first face 165 of electrode layer 130 may be referred to as the solid-state electrolyte composite layer outer edge 180. In some embodiments, the solid-state electrolyte composite layer outer edge 180 can be expressed by the difference between the width of the first face 155 of the solid-state electrolyte composite layer 120 and the width of the first face 165 of the electrode 130 when the solid-state electrolyte composite layer 120 the electrode 130 are in contact or electrical contact. In another embodiment, the solid-state electrolyte composite layer outer edge 180 can be expressed by the difference between the length of the first face 155 of the solid-state electrolyte composite layer 120 and the length of the first face 165 of the electrode 130 when the solid-state electrolyte composite layer 120 the electrode 130 are in contact or electrical contact.

In some embodiments, the solid-state electrolyte composite layer outer edge 170 and the solid-state electrolyte composite layer outer edge 180 may have different overall area where the width of the solid-state electrolyte composite layer outer edge 170 may be smaller than that of the solid-state electrolyte composite layer outer edge 180. In another embodiment, the width of the solid-state electrolyte composite layer outer edge 170 may be larger than that of the solid-state electrolyte composite layer outer edge 180. In a further embodiment, the solid-state electrolyte composite layer 110 may have a width greater than that of the solid-state electrolyte composite layer 120. In yet a further embodiment, the solid-state electrolyte composite layer 110 may have a width less than that of the solid-state electrolyte composite layer 120. In another embodiment, the length of the solid-state electrolyte composite layer 110 may be greater than the length of the solid-state electrolyte composite layer 120. In yet another embodiment, the length of the solid-state electrolyte composite layer 110 may be less than the length of the solid-state electrolyte composite layer 120

In some embodiments, the dimensions of the solid-state electrolyte composite layer 110 and 120 should be such that when the solid-state electrolyte composite layer 110 and 120 is in contact with the electrode 130 that the peripheral face 142 of the solid-state electrolyte composite layer 110 and the peripheral face 152 of the solid-state electrolyte composite layer 120 extends beyond only one side, $S_1$, of the peripheral face 162 of the electrode 130. In another embodiment, the dimensions of the solid-state electrolyte composite layer 110 and 120 should be such that when the solid-state electrolyte composite layer 110 and 120 is in contact with the electrode 130 the peripheral face 142 of the solid-state electrolyte composite layer 110 and the peripheral face 152 of the solid-state electrolyte composite layer 120 extends beyond two side of the peripheral face 162 of the electrode 13 where the two sides, $S_1$ and $S_3$, are parallel to each other. In yet another embodiment, the dimensions of the solid-state electrolyte composite layer 110 and 120 should be such that when the solid-state electrolyte composite layer 110 and 120 is in contact with the electrode 130 that the peripheral face 142 of the solid-state electrolyte composite layer 110 and the peripheral face 152 of the solid-state electrolyte composite layer 120 extends beyond three sides of the peripheral face 162 of the electrode 130 where two sides, $S_1$ and $S_3$, may be parallel to each other while possibly being perpendicular to the other, $S_2$. In yet a further embodiment, the dimensions of the solid-state electrolyte composite layer 110 and 120 should be such that when the solid-state electrolyte composite layer 110 and 120 is in contact with the electrode 130, the peripheral face 142 of the solid-state electrolyte composite layer 110 and the peripheral face 152 of the solid-state electrolyte composite layer 120 extends beyond four sides of the peripheral face 162 of the electrode 130 where; two sides, $S_1$ and $S_3$, may be parallel to each other; two sides, $S_2$ and $S_4$, may be parallel; but sides $S_1$ and $S_3$ may be perpendicular to $S_2$ and $S_4$.

Referring to FIG. 2, the process 200 begins with step 210 wherein the various materials to be used in encapsulated electrode structure may be prepared. For example, to form an encapsulated electrode structure comprising an encapsulated anode structure, an anode active material such a metal foil made of one or more alkali metal for example but not limited to Li, Na, or K may be selected for the electrode. In another embodiment, the encapsulated anode active material may be one or more of an alkali metal alloy for example but not limited to Li—Al, Li—Zn, Li—Mg, Li—Na, Li—K, Li—Na—K, Li—In, Li—Au, Li—Ag, Na—Al, or Na—Zn. In yet another embodiment, the encapsulated anode active material may be one or more of an alkaline earth metal for example but not limited to Mg, Ca, or Ba. In a further embodiment, the encapsulated anode active material may be one or more of an alkaline earth metal alloy for example but not limited to Mg—Al, Mg—Zn, Mg—Ca, Mg—Na, Ca—Al, or Ca—Zn. In yet a further embodiment, the encapsulated anode may be one or more of a material with which lithium was deposited onto where the material alloys with lithium such as but not limited to silicon metal, silicon-carbon composites, Ag, Au, Sn, Pb, In, Ni, Al, or Sb. To form an encapsulated anode, solid-state electrolyte composite may be prepared as appropriate for use with the selected electrode material. In step 220, the SSE and electrodes are layered. In step 230, the SSE and electrodes are contacted to form a stack. In step 240, pressure is applied to the stack. In step 250, the stack is molded, and particularly the SSE layers are molded around the electrode to engulf the edges, and the electrode is encapsulated by the SSEs as pressure is applied.

In step 220, the prepared electrode 130 and solid-state electrolyte composite 110 and 120 may be layered (FIG. 1B) in preparation for contacting in step 230. In some examples, dendrite inhibiting layers may be included between electrode 130 and solid-state electrolyte composite 110 and 120. Furthermore, varied surface treatments may be applied to either electrode 130 or solid-state electrolyte composite 110 and 120 to improve wetting, deformation and/or defect conditions. After contacting, during step 240 pressure is applied substantially normal to the external surfaces of the contacted and layered electrode 130 and solid-state electrolyte composite 110 and 120. The pressure may be applied uniformly or may vary spatially across the surface of the solid-state electrolyte composite external to the layered materials. Pressure may be applied non-uniform via fixed rigid mechanical means or conformally via pneumatic or hydraulic means. As discussed above, in one possible example, calendar rollers may be used.

As pressure is applied to the solid-state electrolyte composite 110 and 120, the portion of the solid-state electrolyte composite 110 and 120 within the boundary of the first face 160 and second face 165 of electrode 130 may start to compact and densify while the SSE layers at the outer edges contact to encapsulate the electrode. Initially, the density of the portion of the solid-state electrolyte composite 110 and 120 that is beyond the boundary of the first face 160 and second face 165 of the electrode 130 denoted 170 and 180 remains substantially unchanged (FIG. 1B) but then begins to also densify. In the case of calendar rollers with some separation distance is uniformly applied to the stack including both where the electrode is present as well as where the two SSE layers abut, the relative thickness differences between where there is the two abutting SSE layers and the thicker area where the upper and lower SSE layers include the electrode layer therebetween, results in a modestly lesser densification pressure where only the two SSE layers abut. Due to encapsulation, however, the relatively greater pressure is focused on densification and does not cause lateral extrusion or any lateral extrusion is quickly suppressed as the encapsulation is formed.

In some instances, the densification process is established such that the outer edge areas of the SSE layers abut and encapsulate the electrode prior to significant pressure application that might result in lateral extrusion of the electrode material. In this way, the electrode is encapsulated prior to pressure application that might otherwise cause lateral extrusion of the electrode material. In such a case, for example, a first "light" lamination pressure may be applied to cause the SSE to form around the electrode. Then, a second "heavy" lamination may be applied to fully densify the layers and form the protected electrode. Light and heavy pressures will depend on the materials present, electrode extrusion characteristics, and the like. Such a technique may be particularly useful when a relatively thick electrode is used as the SSE layer will have to deform more around the edges of the electrode before the SSE layers can touch and fuse. In many instances, however, there may be a consistent lamination pressure applied (not two or more pressures) as only one lamination/densification step is needed as the SSE layer is able to fuse before the lithium extrudes past it. In the case of Lithium, for example, some Lithium flow or extrusion may occur but the fusing of the SSE layers happens so quickly that there is not a detrimental effect from very minimal lateral flow of the Lithium.

With the continued application of pressure to the solid-state electrolyte composite now 112 and 122, the portion of the solid-state electrolyte composite 112 and 122 within the boundary of the first face 160 and second face 165 of electrode 130 may further compact and densify. During this compaction and densification, the portion of the solid-state electrolyte composite 112 and 122 that is beyond the outer boundary of the first face 160 and second face 165 of electrode 132 may come in contact, forming an encapsulated electrode 105. With the continued application of pressure, the portion of the solid-state electrolyte composite 112 and 122 within the boundary of the first face 160 and second face 165 of electrode 132 may reach the desired density. Additionally, the density of the section of the solid-state electrolyte composite 170 and 180 that are now in contact increases but remains at a lower density than that of the portion of the solid-state electrolyte composite 112 and 122 within the boundary of the first face 160 and second face 165 of electrode 132.

In some embodiments, the portion of the solid-state electrolyte composite that is beyond the boundary of the first face 160 and second face 165 of electrode 132 may come in contact and fuse during the densification process.

During the application of pressure, electrode 130 may be deformed though various stages (initial deformation into electrode 132 and final deformation into thinner electrode 135). This deformation of the electrode is restricted due to its being encapsulated by the solid-state electrolyte composite 125, which provides mechanical entrapment of the electrode. This physical structure allows for the application of pressures that far exceed the point at which an electrode active material such as lithium metal or lithium metal alloy would normally deform and flow undesirably. Fully encapsulating the lithium metal or other electrode active materials with the solid-state electrolyte composite prior to fully densifying the layers prevents the lithium or other electrode active material from extruding past the peripheral face 142 or 152 of the solid-state electrolyte composite 110 and 120 or otherwise deforming undesirably.

As the density of solid-state electrolyte composite 110 and 120 increases, its ionic conductivity increases. With the density difference, the portion of solid-state electrolyte composite 110 and 120 within the boundary of the first face 160 and second face 165 of electrode 130 may have a higher ionic conductivity compared to the portion of solid-state electrolyte composite 110 and 120 that is outside the boundary of the first face 160 and second face 165 of the electrode 130. Ions will preferentially follow the path of least resistance (highest ionic conductivity) and thus, the ion conduction will take place primarily within the boundary of the first face 160 and second face 165 of electrode 130 or within the peripheral face 162 of electrode 130.

As the application of pressure and the resulting densification process continues, defects which may occur in solid-state electrolyte composite 110 and 120 may be reduced. Densification may utilize a time range from 0.01 seconds to 5 minutes and a pressure range from 100 psi to 400,000 psi. In another embodiment, the pressure may range from 500 psi to 50,000 psi. In a further embodiment, the pressure may range from 1000 psi to 20,000 psi. Applied pressure may vary, for example, by an increasing ramp of 100 to 1000 psi/s with time under pressure in the range of 0.01 s to 300 s. Densification and or calendaring may occur in a temperature range of approximately −10° C. to 200° C. In another embodiment, the temperature range may be between 0° C. to 150° C. In another embodiment, the temperature range may be between 10° C. to 125° C. In another embodiment, the temperature range may be between 25° C. to 120° C. In another embodiment, the temperature range may be between 45° C. to 115° C. In another embodiment, the temperature range may be between 70° C. to 110° C. Any of the external pressures and/or temperatures may be constant or variable over the process time employed.

Pressure should be appropriately applied such that solid-state electrolyte composite 110 and 120 come into contact to complete the encapsulation in step 250. In some embodiments, the solid-state electrolyte composite 110 and 120 may adhere under the applied pressure.

If insufficient pressure is used, the solid-state electrolyte composite 110 and 120 or 112 and 122 may not come into contact with each other. In the circumstance where adhesion of the solid-state electrolyte composite 110 and 120 is desired, if insufficient pressure is used, adhesion of the contacted portions may be insufficient to ensure sealing of the encapsulation. Alternatively, if excessive pressure is used, solid-state electrolyte composite 110 and 120 may deform non-uniformly producing wrinkling and or buckling resulting in failed encapsulation. If densified solid-state electrolyte composite 110 and 120 is utilized, the portions extending beyond the boundary of the first and second face of electrode 130 denoted 170 and 180 may not sufficiently adhere and complete the encapsulation. To assist in the formation of the portions extending outside of the boundary of the first and second face of electrode 130 denoted 170 and 180, solid-state electrolyte composite 110 and 120 may vary in extension beyond the boundary of the first and second face of electrode 130 denoted 170 and 180. This variance may be expressed by comparing the ratio between the width of the solid-electrolyte composite 110 and 120 ($W_{SEC}$) to the width of the electrode 130 ($W_E$).

If the yield strength of one or more materials of the electrode is less than the pressure needed to densify the solid-electrolyte composite 110 and 120, then the width of the pre-densified solid-electrolyte composite layer may be more than the width of the electrode 130 or $W_{SEC} \geq W_E$. Having a $W_{SEC} \geq W_E$ configuration allows for the solid-electrolyte composite to fully encapsulate the electrode 130 preventing one or more materials of the electrode form extruding beyond the peripheral face 142 or 152 of the solid-state electrolyte composite 110 and 120 when pressures greater than the yield strengths of one or more of the electrode components is applied. If the electrode is not fully encapsulated and pressure greater than the yield strength of one or more of its components is applied, then one or more of those components may extrude beyond the peripheral face 142 or 152 of the solid-electrolyte composite 110 and 120. This may cause shorting of the electrochemical cell.

The electrode 130 may contain one or more materials that have a room temperature compressive yield strength of 50 psi to 400,000 psi. In some embodiments, the room temperature yield strength of an electrode may be 105 psi when the electrode contains materials such as lithium metal. In another embodiment, the room temperature yield strength of the electrode may be 9000 psi when the electrode contains materials such as copper. In another embodiment, the room temperature yield strength of the electrode may be 30,000 psi when the electrode contains materials such as magnesium. In a further embodiment, the room temperature yield strength of the electrode may be 380,000 psi when the electrode contains materials such as steel.

Figure 3A:
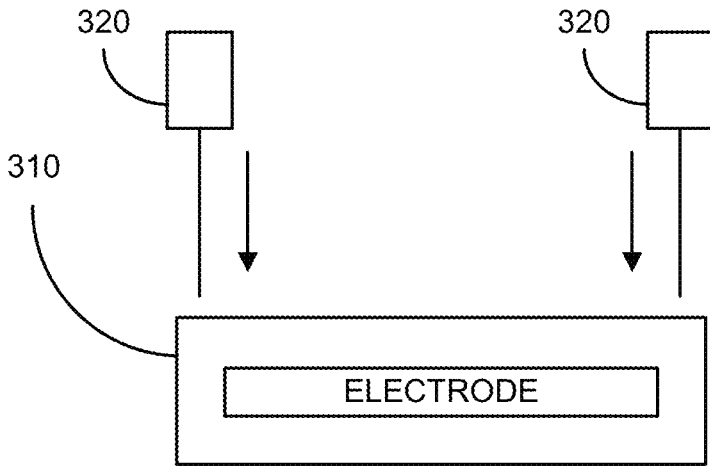
FIG. 3A illustrates the proposed processing of one embodiment of the encapsulated electrode structure 310 and the shearing device 320 appropriately positioned.
Figure 3B:
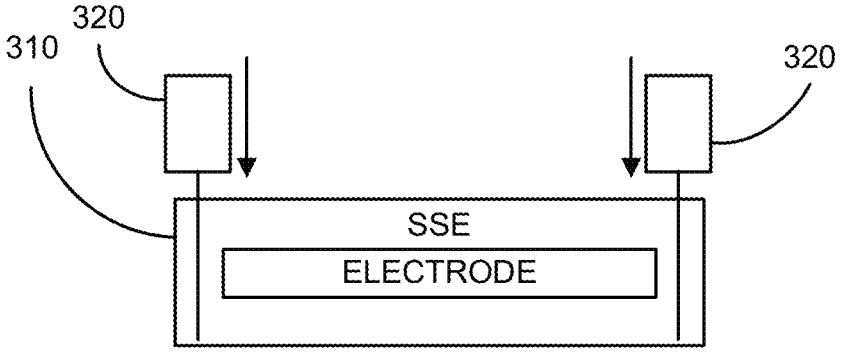
FIG. 3B shows the proposed processing of one embodiment of the encapsulated electrode structure 310 just after shearing is initiated by the shearing device 320.
Figure 3C:
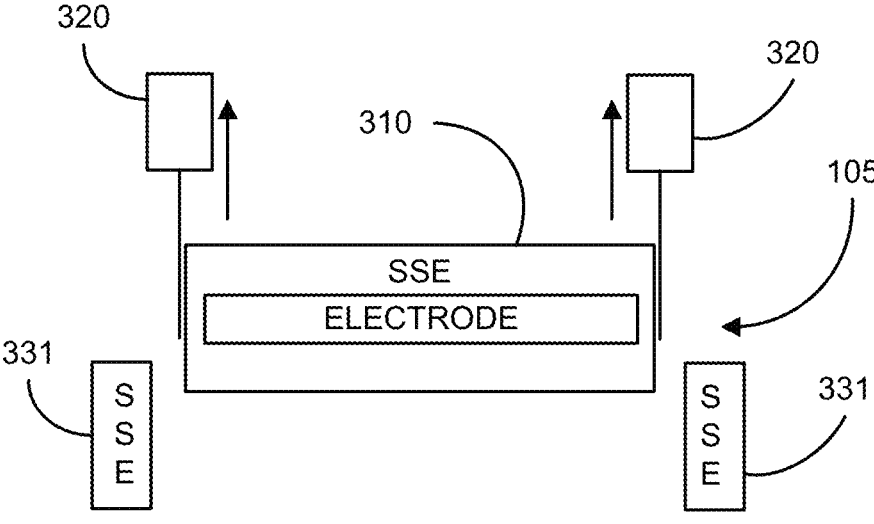
FIG. 3C illustrates the proposed processing of one embodiment of the encapsulated electrode structure 310 after shearing device 320 shears the solid electrolyte composite along the edges of the encapsulated electrode 310 forming encapsulated electrode structure 330 and removing the remaining SSE 331.
Figure 4:
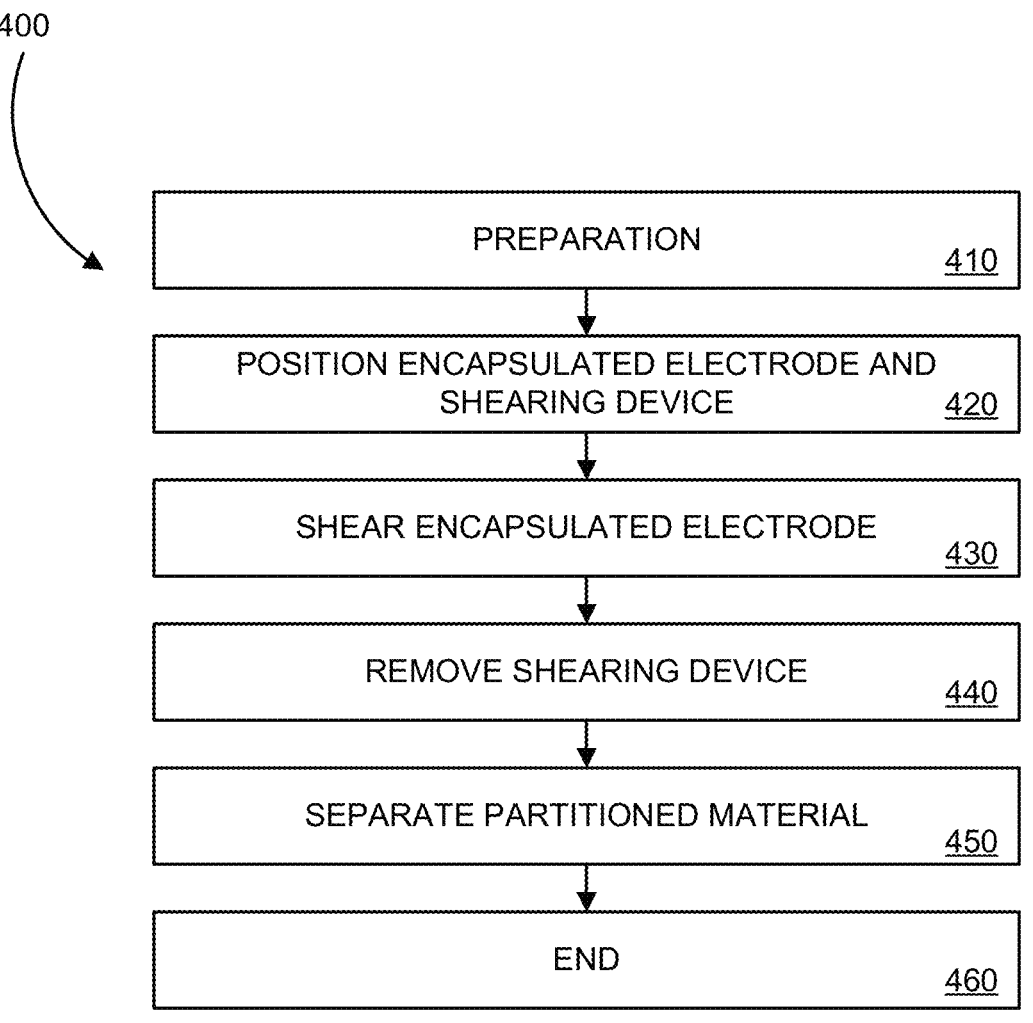
FIG. 4 is a flow chart for a process for partitioning an encapsulated electrode structure.

FIGS. 3A-3C are a set of pictorial representations of process steps for partitioning an encapsulated electrode. In FIG. 3A, the encapsulated electrode 310 and the shearing device 320 may be appropriately positioned. In FIG. 3B, shearing device 320 may be brought into contact with encapsulated electrode 310 and shearing initiated. In FIG. 3C, shearing device 320 may be designed with a cutting edge and body formed to facilitate the shearing of the solid electrolyte composite along the edges of the encapsulated electrode 310 as well as the transport of the solid-state electrolyte composite encapsulating the electrode itself such that the partitioned encapsulated electrodes 330 and 331 are trimmed by the shearing action.

In some embodiments, the shear device may contain one or more cutting instruments such as polymeric, metallic or ceramic blades or edges. In other embodiments the shear device may be a device capable of producing a source of electromagnetic radiation such as microwave, infrared, visible, or ultraviolet or electromagnetic radiation is in the form of a laser. In a further embodiment the shear device may be capable of producing plasma in various temperature ranges ranging from room temperature to 1500 C.

Process 400 begins with step 410 wherein the encapsulated electrode may be prepared for partitioning. Preparation may include, for example, bringing the encapsulated electrode to a temperature suitable for partitioning. In process step 420, the encapsulated electrode and the shearing device may be appropriately positioned. In step 430, shearing device may be brought into contact with encapsulated electrode and shearing initiated. In step 440, the shearing device may be removed and in step 450, the partitioned material may be separated. Process 400 ends with step 460 and may be followed by subsequent application of process 200 in FIG. 2 to ensure re-encapsulation or removal of any added defects.

Figure 5A:
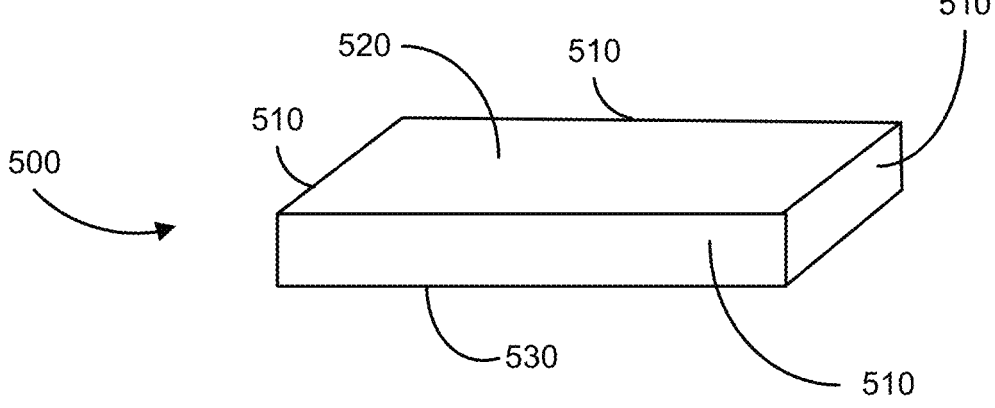
FIG. 5A shows the 3-dimensional structure of one embodiment of the electrode 500.

FIG. 5A is a 3-dimensional representation of electrode 500 (also shown in FIG. 1A and FIG. 1B). Electrode 500 can have a multitude of faces including a peripheral face 510, a first face 520, and a second face 530. In some embodiments, a peripheral face 510 may be substantially perpendicular to the first face 520 and second face 530.

Figure 5B:
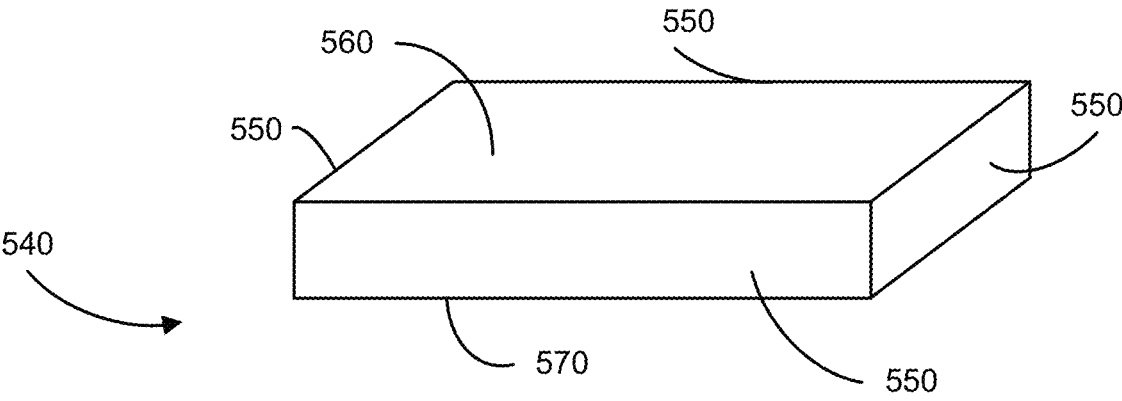
FIG. 5B shows the 3-dimensional structure of one embodiment of the solid electrolyte composite layer 540.

FIG. 5B shows a 3-dimensional representation of the solid-state electrolyte composite 540 (also shown as SSE 110 and/or 120 of FIG. 1A and FIG. 1B). The SSE 540 can have a multitude of faces including a peripheral face 550, a first face 560, and a second face 570. In some embodiments, the peripheral face 550 may be substantially perpendicular to the first face 560 and second face 560.

In FIGS. 5A-5D it should be recognized that the representations of the electrode and SSE are not necessarily to scale. In many instances, the thickness of the peripheral portions of these components will be relatively less in comparison to the length and width dimension depicted. As such, a peripheral face of the electrode will be more akin to an edge or boundary.

The solid-state electrolyte composite layer 540 may be constructed in such a way that the solid-state electrolyte composite in the form of a slurry, dry powder, melts, solution, or deposition is applied to a carrier. This is completed in a manner such that when the solid-state electrolyte composite is applied to a carrier, a layer is formed. This may be accomplished by means of coating, casting, dry powder, or deposition. The carrier may comprise one or more of a metal foil or plastic film. In some embodiments the carrier may be removed from the solid-state electrolyte composite layer 540 before or after any compression or densification.

Figure 5C:
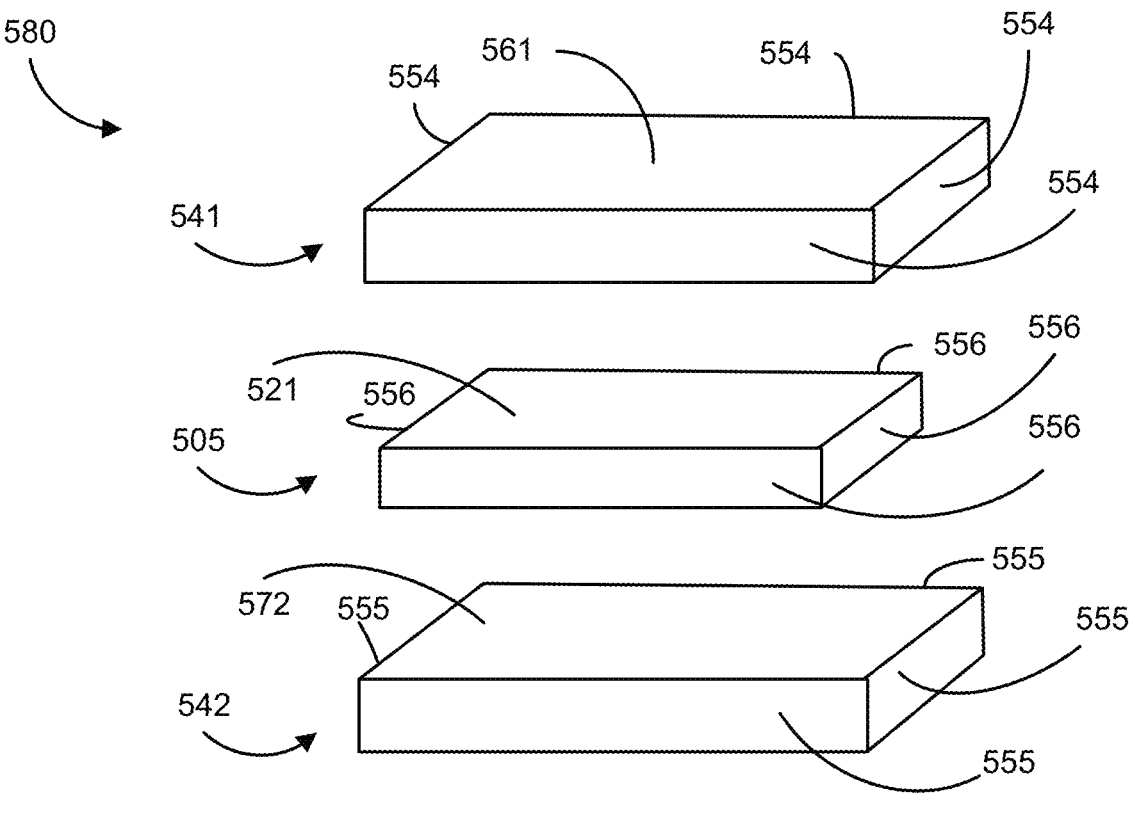
FIG. 5C shows the 3-dimensional arrangement of one embodiment of the encapsulated electrode structure 580 before the three layers are assembled.

FIG. 5C shows a pictorial representation of the encapsulated electrode structure 590 before the layers are assembled, which is a 3-dimensional pictorial representation of encapsulated electrode structure before the layers are assembled. One layer of the encapsulated electrode structure 590 is a first solid-state electrolyte composite (SSE) 541 that has a top surface 561, a bottom surface 571, and a peripheral surface 554. Another layer of the encapsulated electrode structure 590 is the electrode 505 that has a top surface 521, a bottom surface 531, and a peripheral surface 556. Yet another layer of the encapsulated electrode structure 590 is a second SSE 542 that has a top surface 572, a bottom surface 562, and a peripheral surface 555. The first SSE 541 is arranged so as to be attached to the electrode 505, wherein the bottom surface of the first SSE 571 is attached to the top surface of the electrode 521. The bottom surface of the electrode 531 is to be attached to the top surface of the second SSE 572.

Figure 5D:
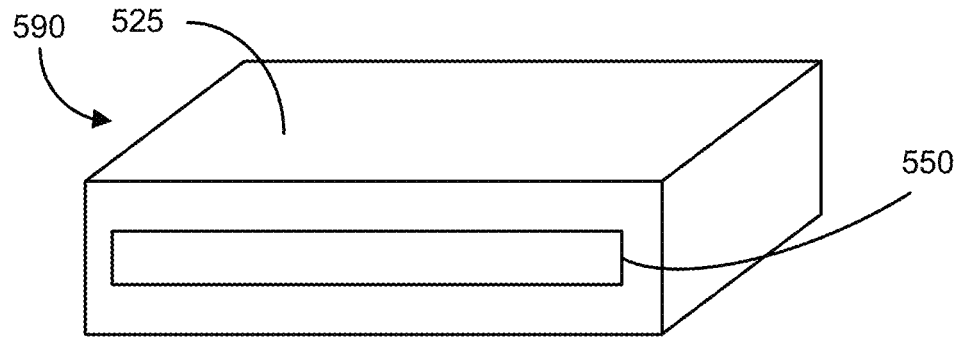
FIG. 5D shows a 3-dimensional representation of encapsulated electrode structure 590 after the continued application of pressure is applied to the layered arrangement.

FIG. 5D shows an encapsulated electrode structure 590 after the continued application of pressure is applied to the arrangement, so that the SSE 541 and SSE 542 come in contact to form a unified SSE 525, which enclosed electrode 535.

Figure 7A:
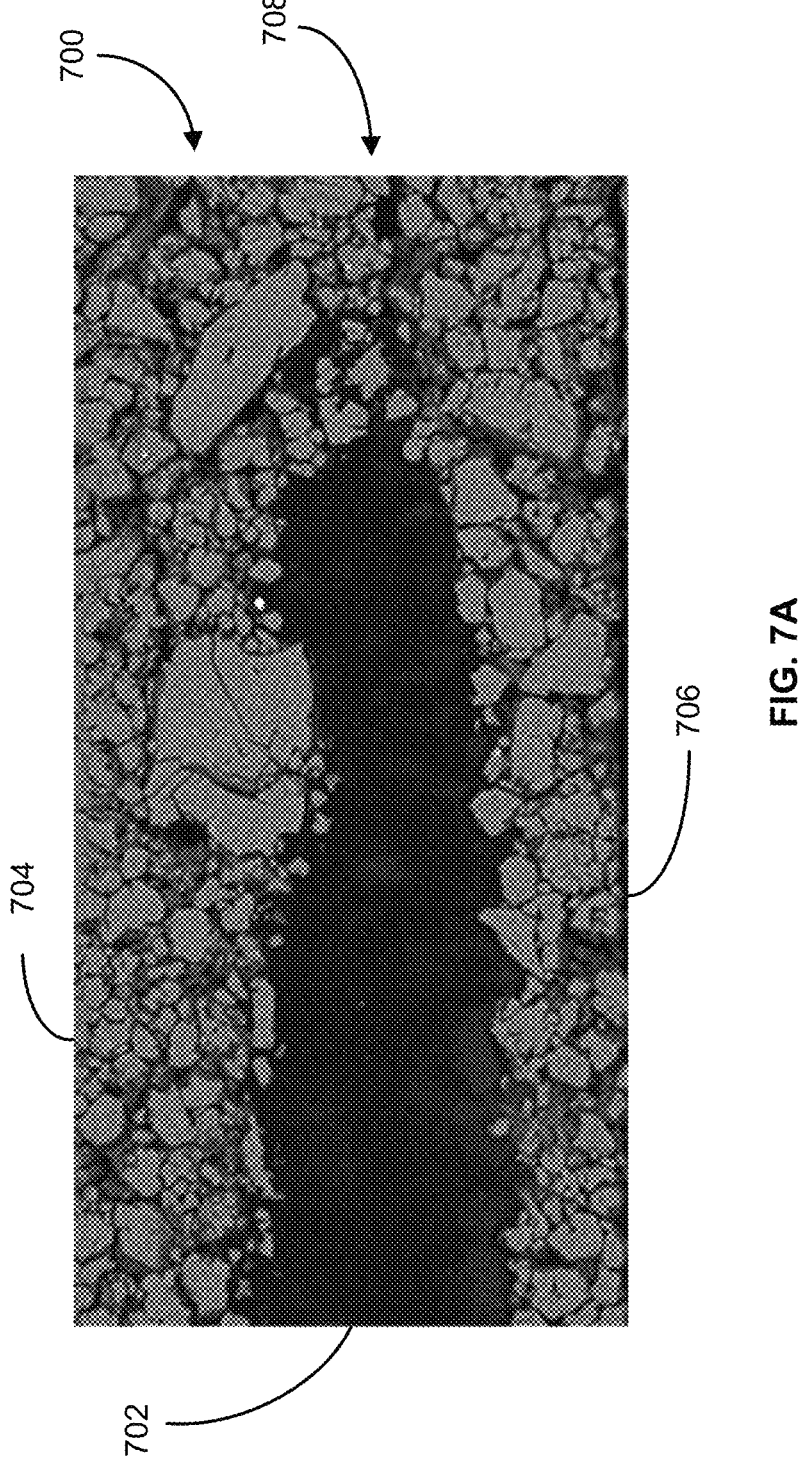
FIG. 7A is a first set of SEM images of a first example of a protected electrode.
Figure 7B:
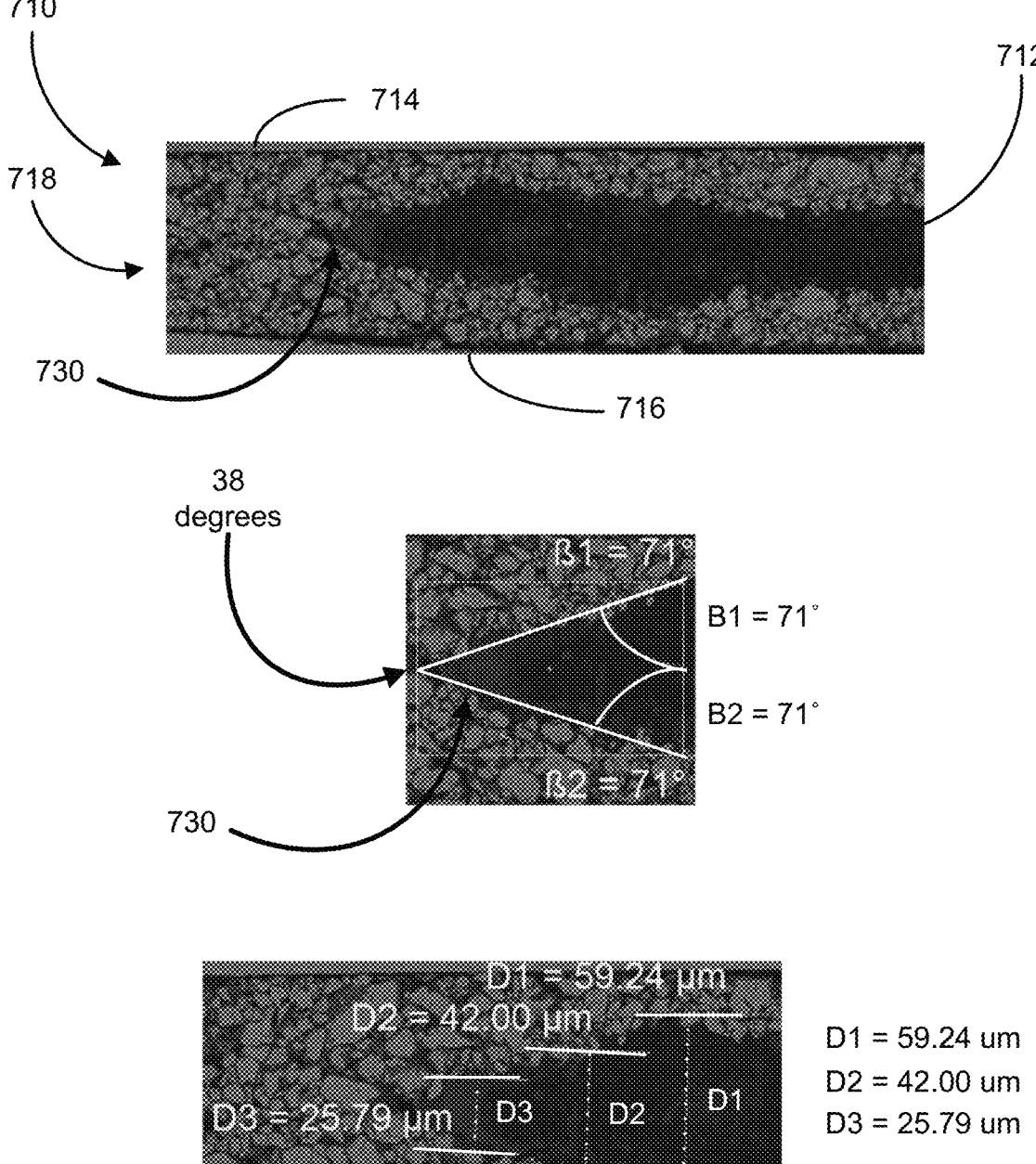
FIG. 7B is a second set of SEM images of a second example of a protected electrode.
Figure 7C:
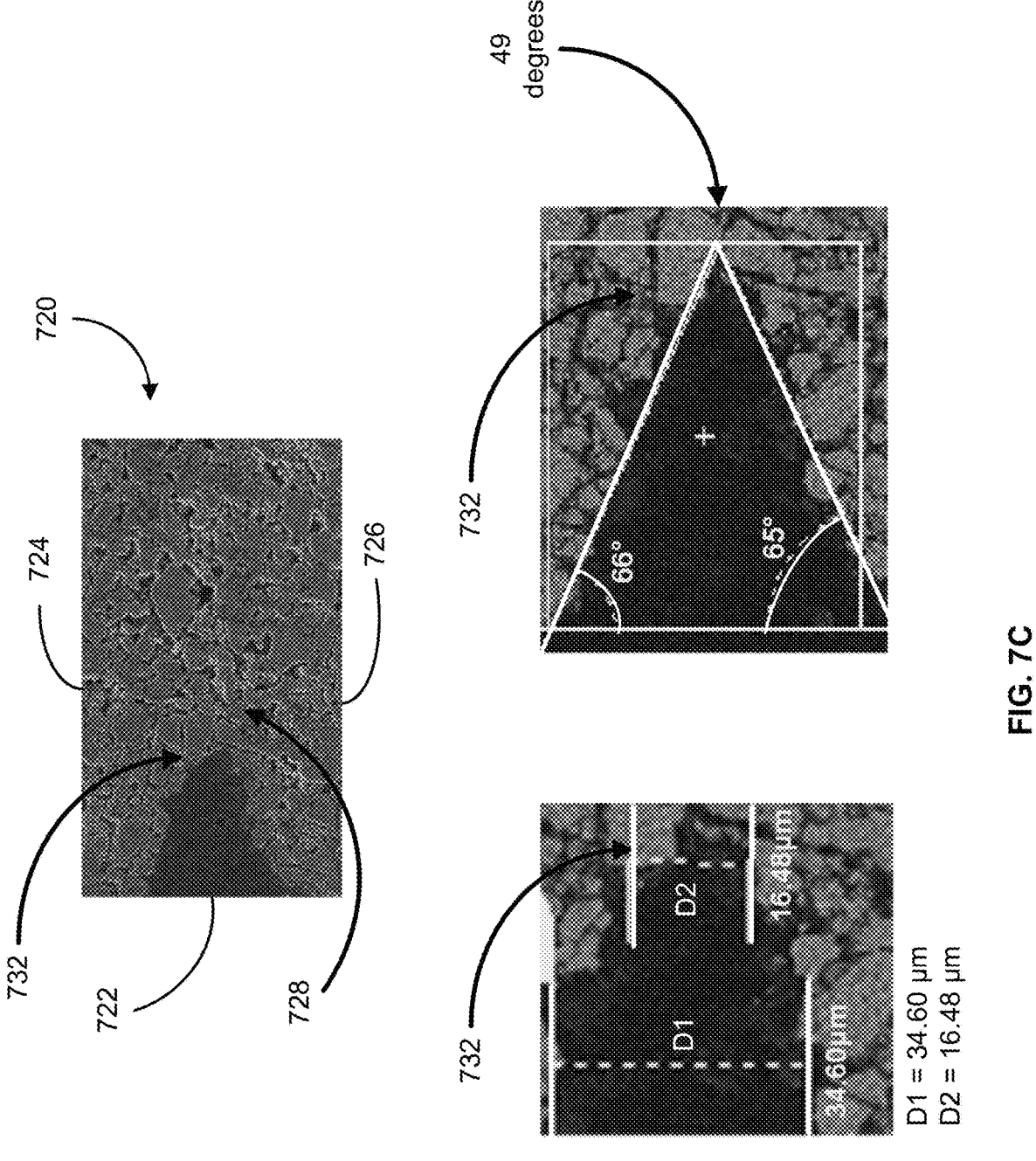
FIG. 7C is a third set of SEM images of a third example of a protected electrode.

FIGS. 7A-7C depict scanning electron microscope (SEM) images of three different protected electrode stacks—e.g., SSE-Electrode-SSE—processed according to the techniques discussed herein.

In all of the examples, the electrolyte material is a $Li_3PS_4$ sulfide electrolyte. Prior to formation of the protected electrode, the electrode includes a sheet of Lithium Metal foil 35 um thick cut into square pieces with an area of about 1 $in^2$ (having a length and width of about 1 in.). The Lithium metal squares were then stored in an Argon environment prior to formation.

To form the solid electrolyte layer (separator layer), 92% w/w of the $Li_3PS_4$ sulfide electrolyte and 8% w/w of a Styrene-butadiene Rubber (SBR) was blended together with Xylenes using a Flacktek mixer. This mixture was then cast onto a 25 um thick carrier foil made of Aluminum using a 200 um blade. The coated layer was then dried in inert conditions. This solid electrolyte layer was then cut into squares pieces with an area of about 1.9 $in^2$ or with a length and width of about 1.375 in.

The SSE layer was about 0.375 inches wider and 0.375 inches longer than the electrode layer. Therefore, if the square electrode was centered between the square SSE layers, there would be about a 0.1875 inch outer edge of the upper and lower SSE layers that face each other and where there is no electrode material therebetween. During formation and densification, a boundary region of about 0.1875 inch of SSE material will contact and form the electrode protection boundary discussed herein. Because the overhang surrounds the electrode on all four sides, the protection forms a square periphery around the electrode.

To demonstrate the effectiveness of the protected electrode technique discussed herein and some characterizing features of the same, three different experiments were performed against the sample materials described above.

In the first example, the protected electrode was formed as follows. The square piece of lithium metal foil, as discussed above, was place on top of and centered on a first 45 um thick SSE layer such that the lithium metal came into contact with the solid electrolyte. In this configuration, the length and width of the Solid Electrolyte layer extended past the length and width of the lithium metal foil by around 0.1875 inches. A second 45 um thick SSE layer was placed on top of and centered on the Lithium metal foil such that the solid electrolyte came into contact with the lithium metal foil. In this configuration, the length and width of the second Solid Electrolyte layer extended past length and width of the lithium metal foil by around 0.1875 inches. The resulting stack is structed such that the layers followed this order: a layer of aluminum foil followed by a Separator Layer containing a solid electrolyte follow by a layers of Lithium Metal followed by a Separator Layer containing a solid electrolyte followed by a layer of Aluminum foil. As mentioned above, the SSE layers directly abutted each other in a square periphery around the electrode, with the abutting dimension being 0.1875 inches.

The stack was then placed in a press and, at room temperature, was laminated by applying a pressure of around 4200 psi (or 8200 psi) for a duration of 4 seconds, and after the 4 seconds, the pressure removed. FIG. 7A is an SEM image through a slice of a protected electrode structure 700 illustrating an electrode 702, an upper (first) SSE layer 704, a lower (second) SSE layer 706 and a boundary region 708 where the upper and lower SSE layers have been laminated together forming a consistent combined "fused" material with no visually identifiable boundary therebetween. In some instances, the SSE layers, such as in cases with larger SSE particle sizes than in the illustrated examples, may not fuse but rather may form an interlocking network able to block electrode extrusion. The lamination of the upper and lower SSE layers also formed an encapsulating (protection) area at the peripheral face of the electrode thereby constraining the electrode from extrusion and enhancing the densification process between the SSE layers and the electrode.

In the example of FIG. 7A, little or no extrusion of the electrode occurred prior to the SSE layers fusing to form the boundary region 708. Thus, as shown, the electrode at the boundary region defines a blunt end reflecting little or no extrusion. This is contrast to the relatively more pointed electrodes resulting from some extrusion and as discussed in more detail below with regard to FIGS. 7B and 7C.

The protected electrode structure of a second example was prepared in the same way as the first example with the exception that the stack was laminated by applying a pressure of around 8400 psi for a duration of 4 seconds, and after the 4 seconds, the pressure removed. As such, the lamination pressure was about twice that applied in the first example. FIG. 7B is an SEM image through a slice of a protected electrode structure 710 illustrating an electrode 712, an upper (first) SSE layer 714, a lower (second) SSE layer 716 and a boundary region 718 where the upper and lower SSE layers have been laminated together forming a consistent material with no visually identifiable boundary therebetween. The lamination of the upper and lower SSE layers also formed an encapsulating (protection) area at the peripheral face of the electrode thereby constraining the electrode from extrusion and enhancing the densification process between the SSE layers and the electrode.

In FIG. 7B (as well as FIG. 7C), the electrode defines a pointed area 730 (pointed area 732) where the SSE layer 714 and layer 716 have fused and at the boundary region 718. The pointed area indicates very modest extrusion of the electrode toward the boundary area as the lamination pressure is applied to the stack to fuse the SSE layers and protect the electrode. The SEM images is along a section of the densified stack. Leading out to the pointed area 730, the electrode defines two faces that converge at the point.

Similarly, the SSE layers define two surfaces that converge toward the boundary region where they are fused. In both of FIGS. 7B and 7C, the SEM image at the respective points 730 and 732, is shown with both angular and thickness measurements. Referring first to FIG. 7B, the point is about 38 degrees, with the upper and lower SSE layers at an angle of 19 degrees relative to plane of the electrode where no extrusion is occurring (or 71 degrees as shown in the figure relative to a perpendicular line between upper and lower planar face of electrode where not extruded). Referring to FIG. 7C, the point is about 49 degrees, with the upper and lower SSE layers at an angle of 24 and 25 degrees (or 66 and 65 degrees as shown in the figure). In general, the angle of the pointed area may be in the range of 10 degrees to 60 degrees.

To further illustrate the formation of the protection boundary of the fused upper and lower layers, along with modest extrusion that is terminated when the boundary forms, FIGS. 7B and 7C also include SEM images with electrode thickness measurements where the respective points are formed.

In the final example of FIG. 7C, the protected electrode structure was prepared in the same way as the second example and at the same pressure except the thickness of the first and second SSE layers used was 75 um. The electrode layer thickness was the same in all three examples. FIG. 7C is an SEM image through a slice of a protected electrode structure 720 illustrating an electrode 722, an upper (first) SSE layer 724, a lower (second) SSE layer 726 and a boundary region 728 where the upper and lower SSE layers have been laminated together forming a consistent material with no visually identifiable boundary therebetween. The lamination of the upper and lower SSE layers also formed an encapsulating (protection) area at the peripheral face of the electrode thereby constraining the electrode from extrusion and enhancing the densification process between the SSE layers and the electrode.

Table 1 illustrates the void differences between the three examples. It can be seen that the void size is generally less in the SSE layers above and below the electrode as compared to the void thickness of the SSE layers outside the boundary of the electrode. At higher lamination pressure, it can be seen that the difference in void size where there are three layers as opposed to the boundary area where there are only two layers of abutting SSE is significantly higher as compared to the lower pressure lamination pressure.

TABLE 1

| Comparison in void space analysis of the three example protected electrode structures and processing conditions | | | | |
|---|---|---|---|---|
| Lamination Pressure (psi) | Separator Layer Thickness (um) | Average Void Fraction-Above/Below Electrode (%) | Average Void Fraction-Beyond Electrode (%) | % Difference |
| Example 1 | 4200 | 45 | 37.4 | 38.6 | 3.2 |
| Example 2 | 8400 | 45 | 34.5 | 40.5 | 17.4 |
| Example 3 | 8400 | 75 | 29.8 | 34.5 | 15.8 |

As will be seen from the experimental data and SEM images, by encapsulating the electrode during densification, the void size may be reduced more substantially where the electrode and SSE layers abut as compared to in the outer edge areas where the SSE layers abut to encapsulate the electrode. In addition, by encapsulating the electrode, it is understood that greater relative densification (relatively smaller void sizes) may occur as compared to densification of like structures under the same pressures with the only distinction being between an encapsulated electrode and a non-encapsulated electrode. In the case of a non-encapsulated electrode, some material, particularly when considering relatively soft Lithium anode materials, will laterally extrude under densification pressures whereas by trapping the electrode through encapsulation by the SSE layers, lateral extrusion is blocked by the relatively harder SSE material thereby increasing the relatively effectiveness of the densification process to relatively reduce void size and generate relatively greater material contact between the electrode layer and the SSE layers.

Features described above as well as those claimed below may be combined in various ways without departing from the scope hereof. It should thus be noted that the matter contained in the above description or shown in the accompanying drawings should be interpreted as illustrative and not in a limiting sense. The above-described embodiments should be considered as examples, rather than as limiting the scope of the disclosure. In addition to the foregoing embodiments, review of the detailed description and accompanying drawings will show that there are other embodiments. Accordingly, many combinations, permutations, variations and modifications of the foregoing embodiments not set forth explicitly herein will nevertheless fall within the scope of this disclosure. The following claims are intended to cover generic and specific features described herein, as well as all statements of the scope of the present method and system, which, as a matter of language, might be said to fall there between.

What is claimed:

1. An encapsulated electrode for an electrochemical cell comprising:
   an electrode layer;
   a first layer of a solid-state electrolyte composite in contact with an upper surface of the electrode layer; and
   a second layer of the solid-state electrolyte composite in contact with a lower surface of the electrode layer opposite the upper surface of the electrode layer;
   wherein the solid-state electrolyte composite is compressed to contact the electrode layer and cause densification at a portion of the first layer of the solid-state electrolyte composite and at a portion of the second layer of the solid-state electrolyte composite, and to cause the portion of the first layer of the solid-state electrolyte composite to contact the portion of the second layer of the solid-state electrolyte composite to encapsulate the electrode layer.

2. The encapsulated electrode for the electrochemical cell of claim 1 comprising one or more of an electrode active material.

3. The encapsulated electrode for the electrochemical cell of claim 1 wherein at least the upper surface, the lower surface, and at least two sides of the electrode layer are encapsulated by the solid-state electrolyte composite.

4. The encapsulated electrode for the electrochemical cell of claim 1 comprising one or more of an anode active material or one or more of a cathode active material.

5. The encapsulated electrode for the electrochemical cell of claim 1 comprising one or more of an alkali metal, an alkaline earth metal, a transition metal or an alloy thereof.

6. The encapsulated electrode for the electrochemical cell of claim 1 wherein the encapsulated electrode comprises lithium metal or a lithium metal alloy.

7. The encapsulated electrode for the electrochemical cell of claim 1 wherein the electrode layer comprises one or more electrode layers.

8. The encapsulated electrode for the electrochemical cell of claim 1 wherein the solid-electrolyte composite comprises one or more solid-state electrolyte materials.

9. The encapsulated electrode for the electrochemical cell of claim 1 wherein the solid-state electrolyte composite comprises one or more polymers in an amount of between 0.5% and 80% by weight of the solid-state electrolyte composite.

10. The encapsulated electrode for the electrochemical cell of claim 9 wherein the one or more polymers comprise at least one thermoplastic elastomer.

11. The encapsulated electrode for the electrochemical cell of claim 9 wherein the one or more polymers comprise fluorine.

12. The encapsulated electrode for the electrochemical cell of claim 1 wherein the electrode layer comprises one or more solid-state sulfide electrolyte.

13. The encapsulated electrode for the electrochemical cell of claim 1 comprising an engineered surface coating comprising one of more of a lithium element, a carbon element, or an oxygen element.

14. The encapsulated electrode for the electrochemical cell of claim 13 wherein the engineered surface coating has a thickness of 1 nm to 100 microns.

15. The encapsulated electrode for the electrochemical cell of claim 1 comprising an encapsulated anode or an encapsulated cathode.

16. A method for manufacturing an encapsulated electrode for a solid-state electrochemical cell comprising:

providing an electrode to be encapsulated:

positioning the electrode to be encapsulated between two layers of solid-state electrolyte composite where the electrode and the two layers of solid state electrolyte composite define a stack with a portion of the stack includes at least three layers including the electrode and the two solid state electrolyte composites and another portion of the stack includes at least two layers of the solid state electrolyte composite and not the electrode; and compressing the stack to contact and encapsulate the electrode where the another portion of the stack is densified to encapsulate a side of the electrode adjacent the another portion.

17. The method of claim 16 wherein the compressing includes applying pressure in the range of 100 to 400,000

PSI thereby causing the solid-state electrolyte composite to densify and deform to cover two or more surfaces of the electrode to be encapsulated.

18. An encapsulated electrode for an electrochemical cell comprising:

an electrode layer with a first face, a second face, and a peripheral surface:

a first layer of solid-state electrolyte composite in contact with and extending beyond a boundary of the first face of the electrode layer; and a second layer of solid-state electrolyte composite in contact with and extending beyond a boundary of the second face of the electrode layer, wherein portions of the first layer and second layer of solid-state electrolyte composite that extend beyond boundaries of the first face and second face of the electrode layer are in contact and encapsulate the electrode, and wherein portions of the solid-state electrolyte composite extending beyond boundaries of the first face and second face of the electrode layer have a lower density than that of portions of the solid-state electrolyte composite within boundaries of the first and second faces.

19. The encapsulated electrode of claim 18 wherein the electrode layer comprises one or more of an electrode active material comprising lithium metal or lithium alloy.

20. The encapsulated electrode of claim 18 wherein the electrode layer comprises an anode capable of conducting alkali metal ions.

21. The encapsulated electrode of claim 18 wherein the electrode layer comprises a current collector comprising stainless steel or copper foils.

22. The encapsulated electrode of claim 20 wherein the anode comprises an engineered coating.

23. The encapsulated electrode of claim 18 wherein a portion of the first face and a portion of the second face converge to a pointed area where the electrode is encapsulated by the portions of the first layer and second layer of solid-state electrolyte composite that extend beyond boundaries of the first face and second face of the electrode layer.

24. The encapsulated electrode of claim 23 wherein the pointed area defines an angle in the range of 10 degrees to 60 degrees.

25. The encapsulated electrode of claim 23 wherein the electrode extrudes during densification such that the portion of the first face and the portion of the second face converge to the pointed area, the extrusion occurring until the electrode is encapsulated.

* * * * *